United States Patent [19]

Hac et al.

[11] Patent Number: 6,035,251
[45] Date of Patent: Mar. 7, 2000

[54] BRAKE SYSTEM CONTROL METHOD EMPLOYING YAW RATE AND SHIP ANGLE CONTROL

[75] Inventors: Aleksander Boguslaw Hac, Dayton; John Francis Hoying, Centerville; Rowland Curl Augustus, Dayton, all of Ohio; Joachim Busshardt; Sean Padraig O'Connell, both of Paris, France; William Chin-Woei Lin, Troy, Mich.; Youssef Ahmed Ghoneim, Macomb Township, Macomb County, Mich.; Hsien Heng Chen, Troy, Mich.; David Michael Sidlosky, Huntington Woods, Mich.; Yuen-Kwok Chin, Troy, Mich.; David John Barta, Dayton, Ohio

[73] Assignee: General Motors Corporation, Detroit, Mich.

[21] Appl. No.: 08/967,091

[22] Filed: Nov. 10, 1997

[51] Int. Cl.$^7$ ...................................................... G06F 7/70
[52] U.S. Cl. ................................ 701/70; 701/78; 701/83; 303/140; 303/146; 303/148
[58] Field of Search ................................. 701/41, 70, 71, 701/72, 74, 78, 83; 303/140, 146, 147, 148, 149, 150

[56] References Cited

U.S. PATENT DOCUMENTS

| | | | |
|---|---|---|---|
| 4,834,205 | 5/1989 | Mizuno et al. | 180/141 |
| 4,998,593 | 3/1991 | Karnopp et al. | 180/140 |
| 5,063,514 | 11/1991 | Headley et al. | 364/426.02 |

(List continued on next page.)

FOREIGN PATENT DOCUMENTS

| | | |
|---|---|---|
| 0 555 860 A1 | 8/1993 | European Pat. Off. . |
| 41 23 235 C1 | 11/1992 | Germany . |
| 41 21 954 A1 | 1/1993 | Germany . |
| 42 00 061 A1 | 7/1993 | Germany . |
| 42 23 385 A1 | 1/1994 | Germany . |
| 42 29 504 A1 | 3/1994 | Germany . |

(List continued on next page.)

OTHER PUBLICATIONS

May The Cornering Force Be With You; Popular Mechanics; Dec. 1995, pp. 74–77.
Stable As She Goes: Don Sherman, Automotive Industries, May 1995.
The Spin Doctors: Don Sherman, 12PS95.
Mercedes/Bosch ESP; Automotive Industries, Apr. 1995.
Controlling Vehicle Stability; Christopher A. Sawyer, Automotive Industries, Jan. 1995.
Let Magic Fingers Do The Driving: Wards Auto World; May 1995.
Technoid: Intelligent Brakes Are On The Way; Car and Driver, Aug. 1994.
Toyota Vehicle Stability Control System; Automotive Engineering, Aug. 1995.
Vehicle Dynamics Offers New Level Of Safety: Machine Design, Sep. 1994.
Handling Control Systems For Your Car: Popular Electronics; Feb. 1995.

(List continued on next page.)

*Primary Examiner*—William A. Cuchlinski, Jr.
*Assistant Examiner*—Gertrude Arthur
*Attorney, Agent, or Firm*—Anthony Luke Simon

[57] ABSTRACT

A brake system control for use in a vehicle with wheels, wheel brakes and a body, comprising the steps of: measuring a plurality of vehicle parameters; responsive to the measured parameters, determining at least a vehicle yaw rate, a vehicle slip angle, a desired yaw rate and a desired slip angle; responsive to the measured parameters, estimating a coefficient of adhesion between the vehicle wheels and a road surface; implementing a control responsive to the vehicle yaw rate and the desired yaw rate with a first authority and responsive to the vehicle slip angle and the desired slip angle with a second authority, wherein the first authority increases as the estimated coefficient of adhesion increases and decreases as the estimated coefficient of adhesion decreases; and controlling the wheel brakes responsive to the control to reduce a first difference between the vehicle yaw rate and the desired yaw rate and to reduce a second difference between the vehicle slip angle and the desired slip angle.

16 Claims, 9 Drawing Sheets

U.S. PATENT DOCUMENTS

| | | | |
|---|---|---|---|
| 5,172,961 | 12/1992 | Inoue et al. | 303/100 |
| 5,229,944 | 7/1993 | Yasuno | 364/426.01 |
| 5,275,475 | 1/1994 | Hartmann et al. | 303/103 |
| 5,311,431 | 5/1994 | Cao et al. | 364/424.05 |
| 5,313,389 | 5/1994 | Yasui | 364/424.05 |
| 5,341,297 | 8/1994 | Zomotor et al. | 364/426.03 |
| 5,366,281 | 11/1994 | Littlejohn | 303/188 |
| 5,402,342 | 3/1995 | Ehret et al. | 364/424.05 |
| 5,444,621 | 8/1995 | Matsunaga et al. | 364/424.05 |
| 5,480,219 | 1/1996 | Kost et al. | 303/146 |
| 5,524,079 | 6/1996 | Ishida et al. | 364/424.05 |
| 5,636,909 | 6/1997 | Hirao et al. | 303/140 |
| 5,700,073 | 12/1997 | Hiwatashi et al. | 303/146 |
| 5,710,705 | 1/1998 | Eckert et al. | 701/72 |
| 5,720,533 | 2/1998 | Pastor et al. | 303/147 |
| 5,742,917 | 4/1998 | Matsuno | 701/69 |
| 5,746,486 | 5/1998 | Paul et al. | 303/146 |

FOREIGN PATENT DOCUMENTS

| | | | |
|---|---|---|---|
| 43 11 077 A1 | 10/1994 | Germany. | |
| 43 14 827 A1 | 11/1994 | Germany. | |
| 40 52 62213 | 10/1993 | Japan | B60T 8/32 |
| 40 60 24304 | 2/1994 | Japan | B60T 8/24 |
| 40 60 87421 | 3/1994 | Japan | B60T 8/24 |
| 40 61 15418 | 4/1994 | Japan | B60T 8/24 |
| 40 61 27354 | 5/1994 | Japan | B60T 8/32 |
| 2 275 551 | 1/1993 | United Kingdom. | |
| 2 263 340 | 7/1993 | United Kingdom. | |
| 2 269 571 | 2/1994 | United Kingdom. | |
| 2 275 312 | 8/1994 | United Kingdom. | |

OTHER PUBLICATIONS

VDC, The Vehicle Dynamics Control System Of Bosch: A. VanZanten, R. Erhardt and G. Pfaff; Robert Bosch GmbH; No. 950759, pp. 9–26.

Active Stability Control; Junichi Kubokawa, Aisin Seiki Co., Ltd., Electronics & Brake Division; Abstract; Sep. 1995.

Consideration of Lateral and Longitudinal Vehicle Stability by Function Enhanced Brake and Stability Control System; Heinz Leffler; SAE #940832; Feb. 28–Mar. 3, 1994.

Control Of Vehicle Dynamics: Automotive Engineering; pp. 87–93; May 1995.

Improvement Of Vehicle Maneuverability By Direct Yaw Moment Control; Y. Shibahata, K. Shimada and T. Tomari; Society of Automotive Engineers of Japan, Inc.; p. 464–481.

Spin Control For Cars; Steven Ashley; Mechanical Engineering; pp. 66–68; Jun. 1995.

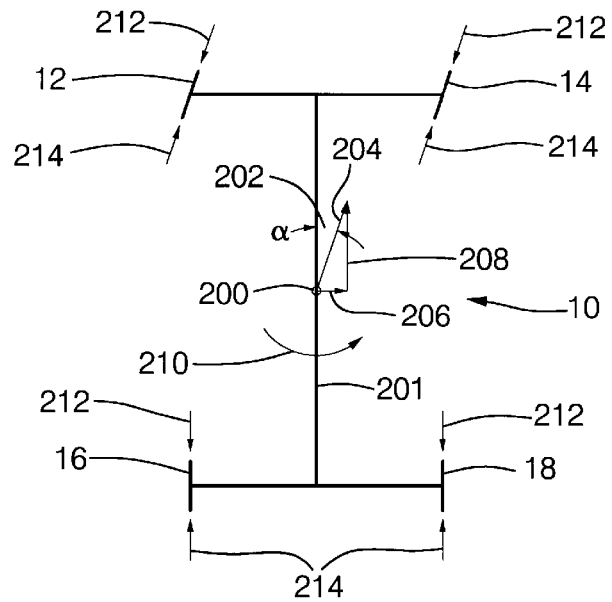

FIG. 2

```
           START
             ↓
    ┌─────────────────┐
    │ RECEIVE INPUTS  │─── 250
    └─────────────────┘
             ↓
   ┌──────────────────────────┐
   │ DESIRED VEHICLE STATES (102) │─── 252
   └──────────────────────────┘
             ↓
      ┌──────────────┐
      │ ESTIMATE μe (120) │─── 254
      └──────────────┘
             ↓
      ┌──────────────┐
      │ ESTIMATE βe (122) │─── 256
      └──────────────┘
             ↓
    ┌────────────────────────┐
    │ CONTROL GAINS (133, 142) │─── 258
    └────────────────────────┘
             ↓
      ┌──────────────┐
      │ CONTROL COMMAND │─── 260
      └──────────────┘
             ↓
     ┌─────────────────┐
     │ ENTER / EXIT CONTROL │─── 262
     └─────────────────┘
             ↓
     ┌──────────────────┐
     │ ACTUATOR COMMANDS │─── 264
     └──────────────────┘
             ↓
       ┌──────────┐
       │  OUTPUT  │─── 266
       │ COMMANDS │
       └──────────┘
             ↓
          RETURN
```

FIG. 4

BRAKE SYSTEM CONTROL METHOD EMPLOYING YAW RATE AND SHIP ANGLE CONTROL

This invention relates to a brake system control.

BACKGROUND OF THE INVENTION

Automotive vehicles have been produced or demonstrated with brake systems that modulate brake force during stops to provide anti-lock brake control (ABS) and/or that modulate brake force during vehicle acceleration to provide positive acceleration traction control (TCS). Some such brake systems additionally provide brake-by-wire control.

More recently, vehicles have been produced with brake systems that activate in certain situations where some or all vehicle tires are experiencing excessive lateral movement relative to the road surface. The brakes are selectively controlled to attempt to bring the vehicle to a desired course and/or to minimize the lateral movement of the tires relative to the road surface.

SUMMARY OF THE INVENTION

It is an object of this invention to provide a chassis control method according to claim 1.

Advantageously this invention provides a chassis control system for actively controlling the road response of a motor vehicle.

Advantageously this invention provides a chassis control method and system that provides closed loop yaw rate control and closed loop slip angle control by developing a yaw force command or a wheel speed difference command from operator inputs such as vehicle speed and steering wheel position. This invention provides a control that balances the requirements of minimizing a difference between the actual vehicle yaw rate and a desired vehicle yaw rate and minimizing a difference between the actual (estimated) vehicle slip angle and a desired vehicle slip angle.

Advantageously, this invention provides yaw and slip angle control commands responsive to the operating conditions of the vehicle to provide a desired vehicle response.

Advantageously, according to one example, this invention provides a brake system control for use in a vehicle with a body, comprising the steps of: determining a first error between an actual yaw rate of the vehicle and a desired yaw rate of the vehicle; determining a second error between an actual slip angle of the vehicle and a desired slip angle of the vehicle; determining a yaw rate command responsive to the first error; determining a slip angle command responsive to the second error; summing the yaw rate command and the slip angle command,; and applying the summation result to at least one vehicle brake actuator, wherein the vehicle brake actuator responsively changes a brake force applied at a corresponding wheel to impart a yaw moment on the vehicle body, wherein the yaw rate command reduces the first error and the slip angle command reduces the second error.

According to a preferred example, the slip angle command is determined by gain sets that vary as a function of vehicle speed and of estimated surface coefficient of adhesion between the vehicle wheels and the road surface and as a function of the slip angle itself.

According to another preferred example, the yaw rate command is also determined responsive to a gain set, wherein the gain set varies responsive to speed of the vehicle and/or the estimated surface coefficient of adhesion between the vehicle wheels and the road surface.

Advantageously, according to another preferred example, slip angle gains increase as the actual slip angle approaches or exceeds a maximum allowable limit, thereby increasing the slip angle control relative to the yaw rate control at high slip angle errors.

Advantageously, according to another preferred example, yaw force command gains increase as the estimate of surface coefficient of adhesion increases, increasing yaw rate control relative to slip angle control on high coefficient of adhesion road surfaces and decreasing yaw rate control relative to slip angle control on low coefficient of adhesion road surfaces.

BRIEF DESCRIPTION OF THE DRAWINGS

The present invention will now be described by way of example with reference to the following drawings, in which:

FIG. 2 illustrates an example diagram of vehicle dynamics according to this invention;

FIGS. 4–8 illustrate command flow diagrams of example control functions according to this invention;

DETAILED DESCRIPTION OF THE INVENTION

Figure 1:
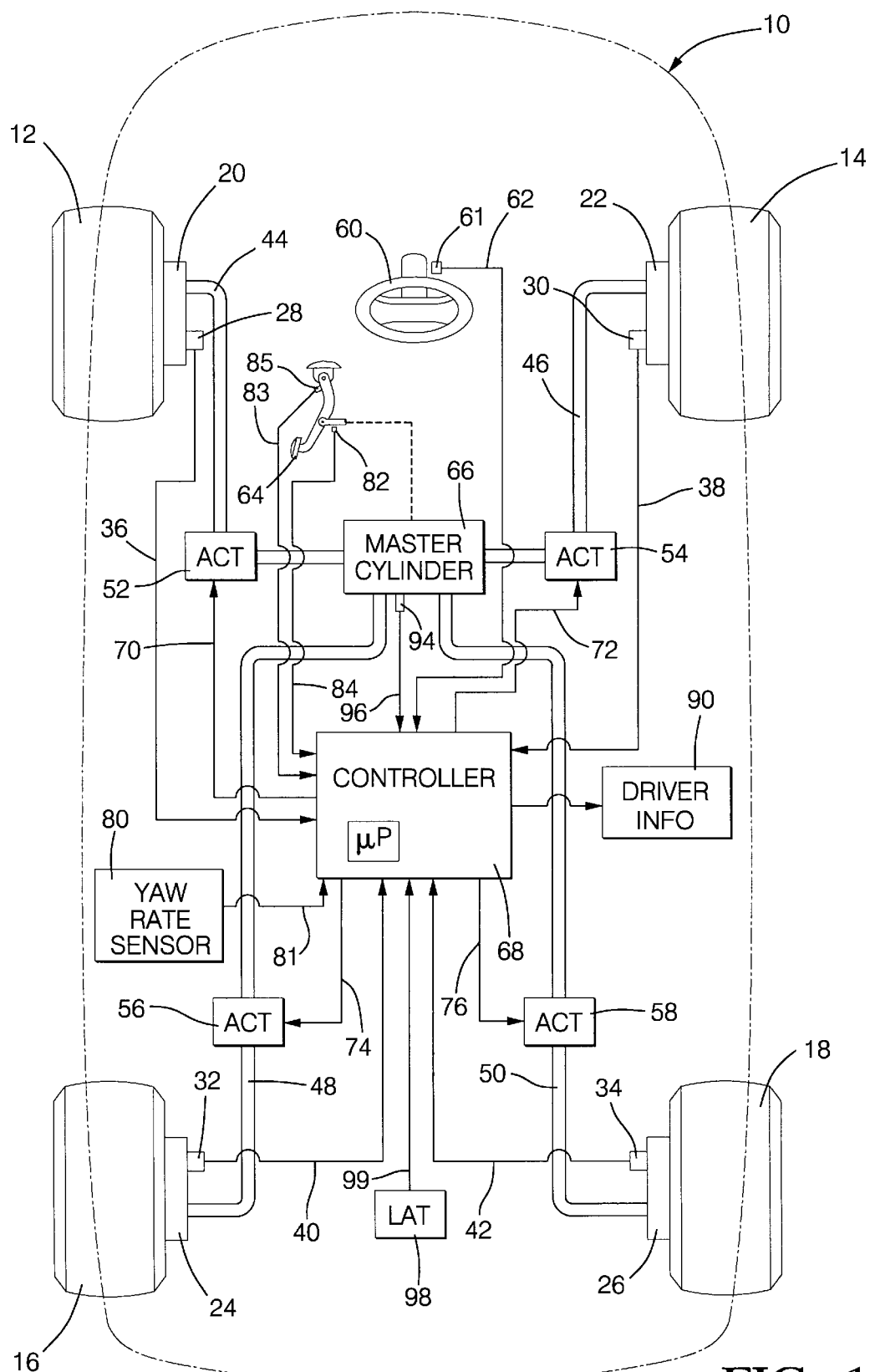
FIG. 1 is an example schematic of a vehicle brake control system according to this invention.

Referring to FIG. 1, the vehicle 10 shown includes a controllable brake system with controller 68 for controlling the brakes 20, 22, 24 and 26 of the vehicle wheels 12, 14, 16 and 18, respectively. Various inputs to the controller 68 include the wheel speed signals on lines 36, 38, 40 and 42 from wheel speed sensors 28, 30, 32 and 34, the brake pedal switch signal on line 84 from brake pedal switch 82, the brake pedal extended travel signal on line 83 from pedal travel sensor 85 (optional), the steering wheel angle signal on line 62 from sensor 61 indicating the angle of steering wheel 60, the yaw rate signal on line 81 from yaw rate sensor 80, the master cylinder pressure signal on line 96 from master cylinder pressure sensor 94 (optional) and the lateral acceleration signal on line 99 from lateral accelerometer 98.

Each of the sensors 28, 30, 32, 34, 61, 80, 82, 85, 98 and 99 is implemented in a manner known to those skilled in the art. The brake pedal travel sensor 85 is a switch mounted to the pedal that provides an output signal when the pedal has been depressed an extended amount indicating "hard" braking by the driver.

In one example, the steering wheel position sensor 61 may be a digital sensor that provides output signals that increment a digital position signal within controller 68 with each degree or partial degree of movement of the steering wheel 60 in one direction and decrement the digital position signal with each degree or partial degree of movement in the opposite direction. The steering wheel sensor 61 may also include an analog sensor position output (i.e., from a rotary resistive device of a known type) that provides approximate steering wheel position information. The analog output can be used, for example, to determine whether the steering wheel is turned less than a preset limit, i.e., 90 degrees, at vehicle start-up. A method for determining the center position of the steering wheel position sensor is disclosed in pending U.S. patent application, Ser. No. 08/664,321, assigned to the assigned of this invention.

Responsive to the various inputs, the controller controls the braking of each wheel in anti-lock braking mode during certain braking maneuvers and in traction control mode during certain vehicle acceleration maneuvers to maintain tractive force of the drive wheels on the road surface. The anti-lock brake control and positive acceleration traction control are performed in a known manner except as modified herein.

The controller 68 also actively controls the wheel brakes 20, 22 (in a two channel system) or 20, 22, 24 and 26 (in a four channel system) responsive to the actual vehicle yaw rate and actual vehicle lateral acceleration as measured by sensors 80 and 98, respectively, to minimize the difference between the actual vehicle yaw rate and a desired vehicle yaw rate and to minimize the difference between the actual vehicle slip angle and the desired vehicle slip angle. Because the base braking, antilock braking and traction control functions are known to those skilled in the art, only a general description thereof will be set forth herein.

When the vehicle is in a braking maneuver, the controller monitors the wheel speed signals from sensors 28, 30, 32 and 34 and determines if one or more of the wheels is in or is about to be in an incipient lock-up condition, in which case anti-lock brake control mode for the one or more wheels is activated. In the anti-lock brake control mode, the controller 68 determines and outputs commands to the actuators 52, 54, 56 and 58 corresponding to the wheels in anti-lock brake mode to modulate brake force to the wheels. Through control of the actuators 52, 54, 56 and 58, the controller prevents the wheels from entering a lock-up condition while achieving effective brake control and steerability in a manner known to those skilled in the art of anti-lock brake control.

When the vehicle is not in a braking maneuver, but is accelerating due to output motive force from the vehicle prime mover, i.e., the internal combustion engine or electric motor, the controller 68 monitors the wheel speeds sensed by sensors 28, 30, 32 and 34 to determine if the wheels transferring motive force to the road surface are slipping or are about to slip. In such wheel conditions, the controller 68 sends commands to the actuators 52–58 corresponding to the wheels that are slipping or are about to slip to provide brake force to the wheels to reduce the slip. Such control is typically performed in conjunction with a parallel control in the engine or motor (and/or the transmission) controller to temporarily reduce the motive force output until wheel-to-road traction is reestablished.

In one example, the brake actuators 52–58 are implemented as reciprocating piston actuators of a type known to those skilled in the art. Such actuators typically include a dc motor positionally controlling a reciprocating piston through a rotary-to-linear motion converter to increase and/or decrease hydraulic pressure in the wheel brakes. In another example, brake actuators 52–58 are implemented as solenoid valves for selectively coupling brakes 20–26 to a source of pressurized hydraulic fluid to increase brake pressure and for selectively coupling brakes 20–26 to a brake fluid reservoir to decrease brake pressure. Implementation of such solenoid valves is known to those skilled in the art. In yet another example, the rear brakes and/or the front brakes may be electric motor-driven brakes, in which case the actuator and brake functions are performed by the same unit. An example of a brake system including front hydraulic brakes and rear electric brakes in which all four brakes are controlled in a brake-by-wire method is set forth in U.S. Pat. No. 5,366,291, assigned to the assignee of this invention.

The example system describe herein performs an active brake control of the two wheel brakes 20 and 22 or of the four wheel brakes 20, 22, 24 and 26 responsive to the steering wheel angle signal on line 62, the yaw rate signal on line 81, the vehicle speed as calculated responsive to the signals from the four wheel speed sensors, the lateral acceleration signal on line 99 and either the brake pedal extended travel sensor 85 or the master cylinder pressure sensor 94. Using these signals, controller 68 determines a desired vehicle yaw rate and compares that desired yaw rate to the actual yaw rate sensed by sensor 80. The controller 68 also determines a desired vehicle slip angle (defined below) and compares that desired vehicle slip angle to the actual vehicle slip angle as determined by an estimator or observer in the controller. If the yaw rate of the vehicle differs from the desired yaw rate by more than a yaw rate threshold that is dynamically determined, or if a desired corrective yaw moment determined responsive to yaw rate error and slip angle error is greater than a yaw moment threshold, controller 68 determines and outputs commands to actuators 52, 54, 56 and 58 to control the vehicle wheel brakes 20, 22, 24 and/or 26 to bring the vehicle yaw rate and slip angle into conformance with the desired yaw rate and slip angle. In a two channel system, only brakes 20 and 22 are controlled via actuators 52 and 54, respectively.

In carrying out these tasks, controller 68 typically includes a microprocessor, ROM and RAM and appropriate input and output circuits of a known type for receiving the various input signals and for outputting the various control commands to the actuators 52, 54, 56 and 58.

Referring now to FIG. 2, the schematic diagram illustrates the concepts of slip angle and yaw rate control. The vehicle 10 has a longitudinal axis 201 oriented in what is referred to as the x direction or the forward direction of the vehicle. The vector denoted by reference 204 illustrates an example true velocity of the vehicle center of gravity, which has a direction oriented at an angle $\beta$, denoted by reference 202, from the x axis or longitudinal axis 201 of the vehicle. The vector 204 has longitudinal (x axis) velocity component 208 and lateral velocity component 206, which is parallel to what is referred to herein as the y axis. Reference 200 represents the vehicle center of gravity.

During vehicle maneuvering operations, there are generally two kinds of vehicle behavior. The first is linear behavior during which the vehicle's yaw rate and slip angle have fixed relationships to steering wheel angle and vehicle forward velocity. A nonlinear operation of the vehicle is characterized by significant lateral movement of at least some of the vehicle tires with respect to the road surface. During nonlinear operation, the vehicle's yaw rate 210 and slip angle 202 deviate from the fixed relationships to steering wheel angle and vehicle forward velocity that are characteristic of linear operation.

This invention advantageously reduces the deviation of the vehicle's yaw rate 210 and slip angle 202 from desired yaw rates and slip angles during many nonlinear operating conditions of the vehicle. The control of the vehicle yaw rate and slip angle is achieved by the selective application of brake forces at the vehicle wheels 12, 14 (in a two channel system) or 12, 14, 16 and 18 (in the four channel system) to induce yaw moments on the vehicle 10 countering the undesirable yaw movement detected of the vehicle 10. These brake forces are illustrated graphically by references 212. Additionally, during braking maneuvers a yaw moment may be introduced by decreasing brake forces at select wheels while maintaining or increasing the brake forces at other wheels. Decreases in brake forces are represented by references 214. Thus, it is through the selective increase and/or decrease of brake forces at the vehicle wheels 12, 14 (two channel system) or 12, 14, 16 and 18 (four channel system) that yaw moments are induced on the vehicle 10 to minimize the respective differences between desired and actual yaw rates and between desired and actual slip angles.

Figure 3:
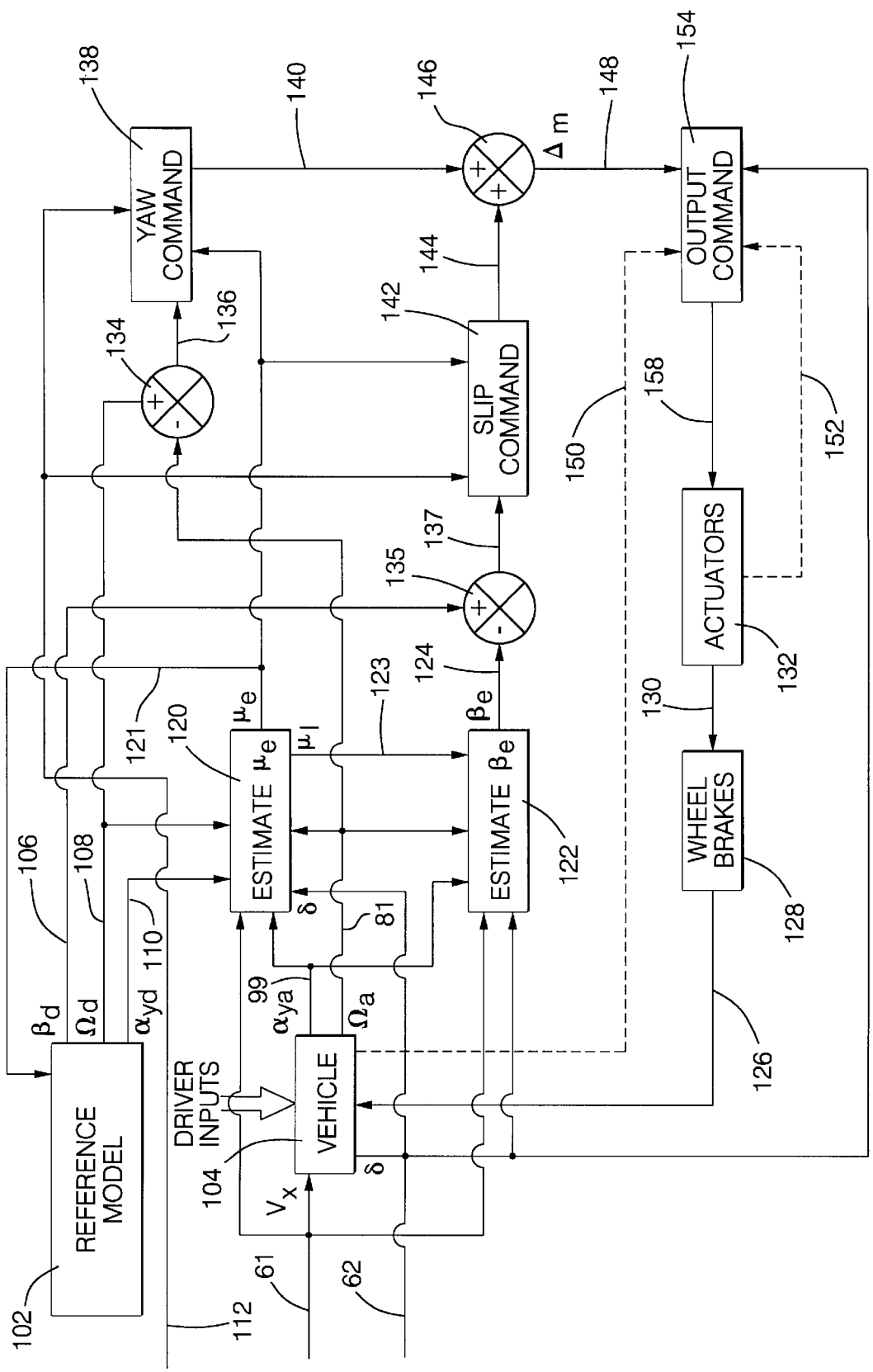
FIG. 3 illustrates an example control according to this invention.

Referring now to FIG. 3, the example control shown includes the vehicle reference model 102, block 104 representing the vehicle, estimators 120 and 122 for estimating the actual surface coefficient of adhesion and vehicle slip angle, respectively, yaw command and slip command control blocks 138, 142, output command block 154 and the brake actuators and wheel brakes represented by blocks 132 and 128, respectively.

In the following sections, time values denoted with a (k) represent present control-loop values and time values denoted by (k-n) represent the nth most recent control-loop values in a conventional manner. Where time value denotations, i.e., (k), are omitted from equations, it is assumed that the time value denotation is (k) unless otherwise specified.

The vehicle reference model receives inputs from lines 112, 62 and 121 representing the vehicle forward velocity, steering wheel angle and estimated surface coefficient of adhesion. The vehicle reference model uses the inputs to calculate desired vehicle slip angle, desired vehicle lateral velocity and desired vehicle yaw rate according to the following equations:

$$v_{yd}(k) = (1+a_{11}*\Delta t)*v_{yd}(k-1) + a_{12}*\Delta t*\Omega_{du}(k-1) + b_1*\Delta t*\delta(k-1),$$

$$\Omega_{du}(k) = a_{21}*\Delta t*v_{yd}(k-1) + (1+a_{22}*\Delta t)*\Omega_{du}(k-1) + b_2*\Delta t*\delta(k-1),$$

and $$\beta_{du} = \text{Arctan}(v_{yd}/v_x),$$

where $\Delta t$ is the sampling period (control loop time) and $$a_{11} = -(c_f + c_r)/(M*v_x), a_{12} = (-c_f*a + c_r*b)/(M*v_x) - v_x,$$

$$a_{21} = (-c_f*a + c_r*b)/(I_{zz}*v_x), a_{22} = -(c_f*a^2 + c_r*b^2)/(I_{zz}*v_x),$$

$$b_1 = c_f/M \text{ and } b_2 = a*c_f/I_{zz},$$

where $\delta$ is the steering angle of the front wheels, M is the total mass of the vehicle, $I_{zz}$ is the moment of inertia of the vehicle about the yaw axis (passing through the center of gravity), a and b are distances from the center of gravity of the vehicle to the front and rear axles, $c_f$ and $c_r$ are cornering stiffness coefficients of both tires of front and rear axles, respectively, $v_x$ is the forward velocity of the vehicle, $v_{yd}(k)$ is the desired lateral velocity of the vehicle at time k, $\Omega_{du}(k)$ is the desired yaw rate (unlimited) of the vehicle at time k and $\beta_{du}$ is the unlimited desired slip angle of the vehicle.

It is noted that the above vehicle model is a preferred example and other vehicle models may be used as alternatives to determining the desired vehicle yaw rate and slip angles.

The reference model 102 then limits the desired values of slip angle and yaw rate, where the maximum value of the desired slip angle is determined responsive to the estimated surface coefficient of adhesion $\mu_e$ determined at block 120 and output on line 121. Typically, road to tire surface coefficient of adhesions are in the range of 0.2 to 1.0; 0.2 representing ice and 1.0 representing dry pavement. The maximum desired slip angle will be predetermined by the vehicle designer and may vary from vehicle type to vehicle type. In one example, the maximum desired slip angle on ice is 4° of slip angle and on a dry surface is 10°. Assuming these parameters, then the maximum desired slip angle, $\beta_{max}$, is determined as follows:

$$\beta_{maxt} = \begin{cases} 10*\pi/180 & \text{when } \mu_e \geq 1.0 \\ (7.5*\mu_e + 2.5)\pi/180 & \text{when } 0.2 < \mu_e < 1.0 \\ 4*\pi/180 & \text{when } \mu_e \leq 0.2 \end{cases}$$

and $$\beta_{max} = \begin{cases} \max(\beta_{maxt}, |\beta_{du}|) & \text{if } \beta_{du}*\delta \geq 0.005 \\ \beta_{maxt} & \text{otherwise} \end{cases}$$

The condition $\beta_{du}*\delta \geq 0.005$ may be replaced by the condition $v_x < [c_r*b*(a+b)/(M*a)]^{1/2}$ since, when this condition is met, the signs of $\beta_{du}$ and $\delta$ are the same. Once $\beta_{max}$ is determined, the desired slip angle is limited according to the following equation:

$$\beta_d = \begin{cases} \beta_{du} & \text{when } |\beta_{du}| \leq \beta_{max} \\ \beta_{max}*(|\beta_{du}|/\beta_{du}) & \text{when } |\beta_{du}| > \beta_{max} \end{cases}$$

According to the above equations, $\beta_d$ is not limited when the signs of slip angle and steering angle are the same, or equivalently when vehicle speed is below the value defined above.

The desired yaw rate, $\Omega_d$, is determined as $\Omega_{du}$, limited to plus and minus a predetermined parameter set, for example equal to 0.2 or 0.3 radians per second above the maximum yaw rate sustainable by the vehicle on a dry (high coefficient of adhesion) surface. The limit on the desired yaw rate may be speed dependent (e.g., the maximum magnitude for $\Omega_d$ may be limited to $a_{ymax}/v_x + 0.3$).

The desired lateral acceleration, $a_{yd}$, is determined as:

$$a_{yd} = v_{yd}' + v_x*\Omega_{du},$$

where $v_{yd}'$ is the time derivative of $v_{yd}$ and may be computed as:

$$a_{11}*v_{yd} + a_{12}*\Omega_{du} + b_1*\delta$$

or as $$(v_{yd}(k) - v_{yd}(k-1))/\Delta t.$$

The reference model 102 outputs the desired slip angle, $\beta_d$, on line 106, the desired yaw rate, $\Omega_d$, on line 108 and the desired lateral acceleration, $a_{yd}$, on line 110.

The desired lateral acceleration on line 110 and the actual vehicle lateral acceleration on line 99, are provided to block 120 along with the measured vehicle yaw rate, $\Omega_a$, on line 81, desired yaw rate, $\Omega_d$, steering angle, $\delta$, and vehicle speed, $v_x$. Block 120 uses the actual and desired lateral accelerations and the actual and desired vehicle yaw rates to estimate a coefficient of adhesion between the road surface and the vehicle tires.

Before measured lateral acceleration is used in the algorithm, it is multiplied by a roll factor, $r_{fac}$, in order to reduce the effect of vehicle roll during turning maneuvers on the measured lateral acceleration. The roll factor may be computed as:

$r_{fac} 1/(1+M*g*h/\phi)$, where h is the height of the vehicle center of gravity and $\phi$ is the total roll stiffness of the vehicle suspension. For a typical sedan, $r_{fac} \approx 0.9$. From this point on, the term measured lateral acceleration, $a_y$, refers to the lateral acceleration measured by the sensor 98, multiplied by $r_{fac}$ and filtered through a low pass filter, e.g., a second order Butterworth filter having a cut off at 40 rad/s to reduce noise from the sensor signal.

The estimation at block 120 first uses the steering angle and vehicle velocity to compute a value, $\Omega_{dss}$, referred to as the desired yaw rate at steady state, as follows:

$$\Omega_{dss} = v_x * \delta / ((a+b) + K_u * v_x^2),$$

where $K_u$ is the vehicle understeer coefficient, defined as:

$$K_u = (c_r * b - c_f * a) * M / (c_f * c_r * (a+b)).$$

The value $\Omega_{dss}$ differs from $\Omega_d$ in that it does not account for the dynamic delay in the vehicle model that is included in the calculation of $\Omega_d$. The measured and desired lateral accelerations are passed through identical low pass filters to attenuate noise in the measured lateral acceleration signal. The desired lateral acceleration is then filtered through another low pass filter, for example, a standard second order Butterworth filter with a cut off frequency of 22 radians per second in order to reduce or eliminate the phase difference between the two signals. Then a value, $a_{ydfl}$, is determined by limiting the output of the Butterworth filter to $+/-a_{ymax}$, where $a_{ymax}$ is the maximum lateral acceleration that the vehicle can sustain on a dry surface. The magnitude of the lateral acceleration error, $\Delta_{ay}$, is then determined according to:

$$\Delta a_y = |a_{ydfl} - a_y|,$$

where $a_y$ denotes the measured and filtered lateral acceleration. The value $\Delta a_y$ is then filtered through a first order digital low pass filter, for example, with a cut off frequency of 2 radians per second, to yield the filtered lateral acceleration error, $\Delta a_{yf}$.

A preliminary estimate of lateral surface coefficient of adhesion, $\mu_{ay}$, is determined according to:

$$\mu_{ay} = |a_y| / a_{ymax}.$$

Then a value $\mu_{temp}$ is determined equal to $\mu_{ay}$ if all of the following conditions are met simultaneously:

(a) $|a_{ydfl}| - |a_y| > \text{THRESH1};$ (b) $|\Omega_{dss} - \Omega_a| > \text{THRESH2};$ and (c) the signs of the desired and actual lateral accelerations are the same and have been the same for at least a specified period of time, e.g., 0.3 seconds.

In condition (b) above, $\Omega_d$ could be used instead of $\Omega_{dss}$, but $\Omega_{dss}$ is preferable because the yaw rate error developed from $|\Omega_{dss} - \Omega_{da}|$ is more likely to be in phase with lateral acceleration error than $|\Omega_d - \Omega_a|$.

In the condition (c) above, the time that desired and actual lateral accelerations have opposite signs is tracked, for example, with a timer Ti, defined as:

$$Ti = \begin{cases} 0 & \text{if } a_{ydfl} * a_y < -0.1 \text{ or } a_{yd} * a_y < -0.1 \\ Ti + \Delta t, & \text{otherwise} \end{cases}$$

where $a_{yd}$ is the desired (unfiltered) lateral acceleration, $\Delta t$ is the loop time of the control algorithm and 0.1 is an example constant to be determined as appropriate by the system designer. Condition (c) is met when Ti>0.3 seconds.

Also $\mu_{temp}$ is set equal to $\mu_{ay}$ if the following three conditions are met simultaneously: (a) the vehicle velocity is small, for example, below 7 meters/second; (b) the signs of $a_{ydfl}$ and $a_y$ are the same and have been the same for at least a specified period of time, e.g., 0.3 seconds; and (c)$|\Omega_d - \Omega_a| \geq \text{THRESH3}$, where THRESH1, THRESH2 and THRESH3 are predetermined threshold values corresponding to lateral acceleration error and two yaw rate errors when the vehicle's behavior begins to deviate significantly from that of the linear model (i.e., the vehicle enters a non-linear range of operation). Example values for THRESH1, THRESH2 and THRESH3 are 1.2 m/s$^2$, 0.10 rad/s and 0.14 rad/s, respectively. These threshold values may be made speed dependent. Also the value $\mu_{temp}$ is set equal to $\mu_{ay}$ regardless of the above conditions if the following condition is met:

$$|a_y|/a_{ymax} > 1.05 * \mu_{temp}.$$

This above condition corrects the surface estimate when the magnitudes of measured lateral acceleration rises at least a given percentage (e.g., 5%) above the value that the present surface estimate would permit ($\mu_{temp} * a_{ymax}$).

The reset value for $\mu_{temp}$ is 1.0 and $\mu_{temp}$ is reset to 1.0 when the following conditions are simultaneously met:

(a)$|a_{ydfl} - a_y| \leq \text{THRESH1}$, (b)$\Delta a_{yf} < 0.5 * \text{THRESH1}$, (c)$|\Omega_d - \Omega_a| < \text{THRESH3}$, and the $a_{yd}$, $a_{ydfl}$ and $a_y$ have the same sign and have had the same sign for at least a specified time period, e.g., Ti>0.3 seconds.

If neither the set of criteria indicating linear operation nor the set of conditions triggering calculation of surface estimate from lateral acceleration are met, then the estimate $\mu_{temp}$ is maintained at its most recent estimated value, i.e., $\mu_{temp}(k) = \mu_{temp}(k-1)$.

A value $\mu_{new}$ is determined according to:

$$\mu_{new} = (0.85 + 0.15 * \mu_{temp}) * \mu_{temp},$$

where the parameters 0.85 and 0.15 may vary for different types of vehicles. The value $\mu_{new}$ is then limited to no less than 0.07 and no greater than 1.0 to get $\mu_L$, which is output on line 123 as the estimated surface coefficient of adhesion used in the slip angle estimation block 122. The estimated surface coefficient of adhesion used for the control blocks 138 and 142 and used in the vehicle reference model 102 is determined by passing $\mu_{new}$ through a low pass filter, for example a second order Butterworth filter having a cut off frequency of 1.5 Hz. The filter output is then limited to no less than 0.2 and no greater than 1.0 to determine $\mu_e$, the signal on line 121.

Block 122 estimates the actual slip angle of the vehicle using the steering wheel angle signal on line 62, the actual measured vehicle yaw rate on line 81, the actual measured vehicle lateral acceleration on line 99, estimated vehicle speed $v_x$ and the estimated lateral surface coefficient of adhesion, $\mu_L$, on line 123. The slip angle estimation implements an iterative observer to determine the estimated vehicle slip angle, $\beta_e$. The observer first estimates the side slip angles of front and rear axles using the following equations:

$$\alpha_{fe} = (v_{ye}(k-1) + a*\Omega_a)/v_x - \delta \text{ and}$$

$$\alpha_{re} = (v_{ye}(k-1) - b*\Omega_a)/v_x,$$

where $v_{ye}(k-1)$ is the estimated lateral velocity from the previous iteration of the observer, $\alpha_{fe}$ and $\alpha_{re}$ are the front and rear axle side slip angles.

The observer next estimates lateral forces of the front axle, $F_{yf}$, according to:

$$F_{yfe} = \begin{cases} -c_f * \alpha_{fe}(1 - b_{cf} * |\alpha_{fe}|/\mu_L), \text{ if } |\alpha_{fe}| < \mu_L * \alpha_{f^*} \\ -N_{f^*} * (|\alpha_{fe}|/\alpha_{fe}) * [\mu_L + s_f * (|\alpha_{fe}|/\alpha_{f^*} - \mu_L)] \\ \qquad\qquad\qquad\qquad\qquad \text{if } |\alpha_{fe}| \geq \mu_L * \alpha_{f^*} \end{cases}$$

where $s_f$ is a small non-negative number (the slope of the $F_{yf}-\alpha_f$ curve at the limit of adhesion), e.g., $s_f=0.05$, and where $\alpha_{f^*}$ is defined by:

$$\alpha_{f^*} = 1/(2*b_{cf})$$

where $b_{cf}$ is defined by:

$$b_{cf} = c_f/(4*N_{f^*}),$$

where $$N_{f^*} = M*b*(a_{ymax} + \Delta_a)/(a+b)$$

where $a_{ymax}$ is the maximum lateral acceleration that the vehicle can sustain on a dry surface in m/s² and $\Delta_a$ is a constant, e.g., $\Delta_a = 0.5$ m/s².

The observer next estimates lateral forces of the rear axle, $F_{yre}$, according to:

$$F_{yre} = \begin{cases} -c_r * \alpha_{re}(1 - b_{cr} * |\alpha_{re}|), \text{ if } |\alpha_{re}| < \mu_L * \alpha_{r^*} \\ -N_{r^*}(|\alpha_{re}|/\alpha_{re}) * [\mu_L + s_r * (|\alpha_{re}|/\alpha_{r^*} - \mu_L)], \text{ if } |\alpha_{re}| \geq \mu_L * \alpha_{r^*} \end{cases}$$

where $s_r$ is a small non-negative number, e.g., $s_r = 0.05$ and where $\alpha_{r^*}$ is defined by:

$$\alpha_{r^*} = 1/(2*b_{cr})$$

where $b_{cr}$ is defined as:

$$b_{cr} = c_r/(4*N_{r^*})$$

where $$N_{r^*} = M*a*(a_{ymax} + \Delta_a)/(a+b).$$

The observer then estimates a system state value, $q(k)$, according to:

$$q(k) = q(k-1) + \Delta t * \{-(1+g_2)*v_x*\Omega_a + ((1+g_3)/M - a*g_1/I_{zz})*F_{yfe} + ((1+g_3)/M + b*g_1/I_{zz})*F_{yre} + (g_2 - g_3)*a_y - g_4*\Delta A_{yf}\},$$

where $\Delta A_y$ is defined as:

$$\Delta A_y = a_y - (F_{yfe} + F_{yre})/M,$$

and $\Delta A_{yf}$ is $\Delta A_y$ passed through a first order digital low pass filter, for example, with a cut off frequency of 1 rad/s.

The state value, $q(k)$, is then used to determine estimates of lateral velocity, $v_{ye}$, and slip angle, $\beta_e$, as follows:

$$v_{ye}(k) = (q(k) + g_1*\Omega_a)/(1+g_2) \text{ and}$$

$$\beta_e = \text{Arctan }(v_{ye}(k)/v_x).$$

The gains $g_1$, $g_2$, $g_3$ and $g_4$ are tuning parameters preset by a system designer, typically through experimentation on a test vehicle, and may vary from implementation to implementation. The estimated slip angle determined by block 122 is output on line 124.

The desired vehicle yaw rate, $\Omega_d$, and actual vehicle yaw rate, $\Omega_a$, are summed at block 134 to provide a yaw rate error signal on line 136, which is provided to the yaw rate command block 138. Similarly, the desired vehicle slip angle, $\beta_d$, and the estimated vehicle slip angle, $\beta_e$, are summed at block 135 to provide a slip angle error signal on line 137, which is provided to the slip angle command block 142.

Blocks 138 and 142 determine yaw rate and slip angle commands through a set of gains that are responsive to the vehicle speed signal on line 112 and to the estimated surface coefficient of adhesion, $\mu_e$. The commands from blocks 138 and 142 are summed at block 146, which provides the summation result, $\Delta M$, on line 148 to block 154.

More particularly, the functions of blocks 134, 135, 138, 142 and 146 may be explained as follows. A set of control gains are determined by first determining a value $k'_{\beta p}$ according to:

$$k'_{\beta p} = \begin{cases} 0, \text{ if } v_x \leq v_{x1} \\ -(141.7 + 75/\mu_e)*v_x + (1133.6 - 100/\mu_e, \text{ if } v_{x1} < x_x < 20, \\ -1700 - 1600/\mu_e, \text{ if } v_x \geq 20 \end{cases}$$

where $$v_{x1} = (1133.6 - 100/\mu_e)/(141.7 + 75/\mu_e).$$

Figure 9:
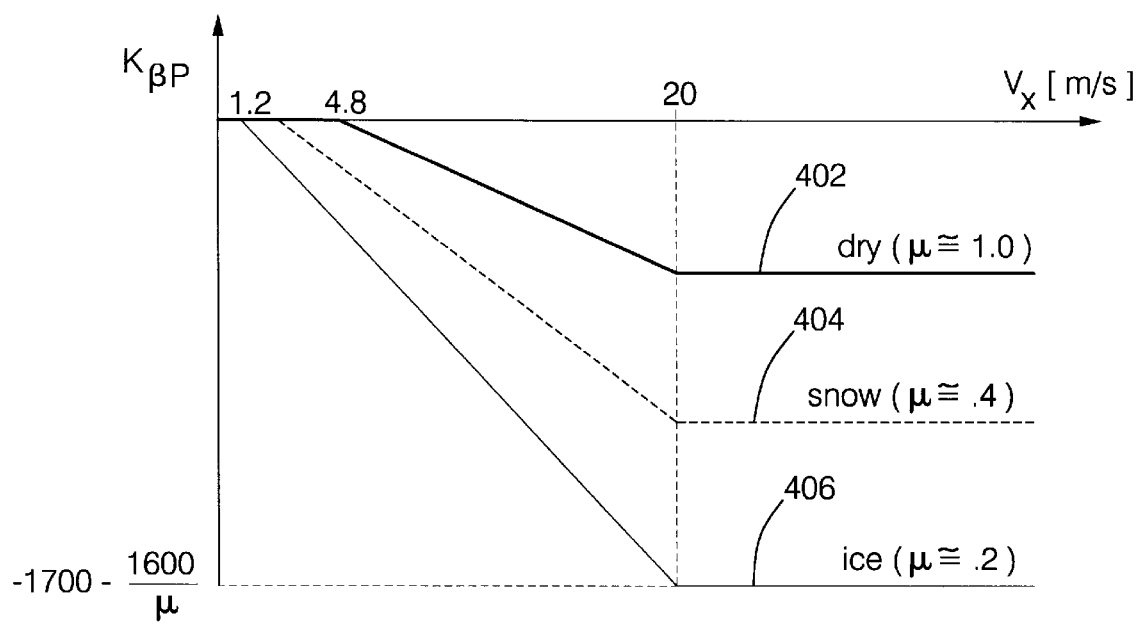
FIGS. 9–11 illustrate example gain functions for use with the example system described below.

The magnitude of the gain increases as $\mu_e$ decreases and increases with vehicle speed until it saturates at a predetermined vehicle speed, for example, at 20 m/s. The gains are represented graphically in FIG. 9 for three different surfaces, dry surface (reference 402) for which $\mu=1.0$, snow (reference 404) for which $\mu=0.4$ and ice (reference 406) for which $\mu=0.2$. The gain calculation may be implemented as an equation or using look-up tables providing the general shape shown in FIG. 9.

Next, a factor $f_1$ is determined according to:

$$f_1 = (k_{off} + k_{mult}*|\beta_e|/\beta_{max})^2,$$

where $K_{off}$ and $k_{mult}$ are tuning parameters having example values of 1 and 0.5, respectively. The factor $f_1$ is then limited to a maximum value, for example, 4. As can be seen by the above equation, $f_1$, increases in value when the vehicle slip angle approaches or exceeds the maximum allowable limit. This function allows $f_1$ to regulate the tradeoff between control of yaw rate and control of slip angle. As the vehicle slip angle approaches the limit $\beta_{max}$, which occurrences may also be characterized by a high slip angle error, the factor $f_1$ increases the control influence or authority of the slip angle correction control as compared to the yaw rate correction control, thus providing an advantageous tradeoff between yaw rate and slip angle control. The increase in slip angle correction control authority is reflected in the proportional and derivative gains, $k_{\beta p}$ and $k_{\beta d}$, respectively, for the slip command, determined using $f_1$ as follows:

$$k_{\beta p} = c_1 * f_1 * k'_{\beta p}, \text{ and}$$

$$k_{\beta d} = c_{\beta d} * k_{\beta p},$$

where $c_1$ is a tuning constant used to balance between slip angle control and yaw rate control and $c_{\beta d}$ is the ratio between the differential and proportional gains, e.g., $c_{\beta d} = 0.7$.

The yaw rate proportional and derivative gains, $k_{\Omega p}$ and $k_{\Omega d}$, are determined as follows:

$$k_{\Omega p} = f_2 * k'_{\Omega p}, \text{ and}$$

$$k_{\Omega d} = c_{\Omega d} * k_{\Omega p},$$

where $c_{\Omega d}$ is a constant (i.e., $c_{\Omega d} = 0.4$), where $k'_{\Omega p}$ is a preliminary gain that may either be constant or velocity dependent and where $f_2$ is a function of $\mu_e$, determined according to $$f_2 = 1.25 * ((c_2 - 0.2) + (1 - c_2) * \mu_e),$$

where $c_2$ is a calibration constant, $0 \leq c_2 < 1$, e.g., $c_2 = 0.4$. The above equations illustrate that the yaw rate gains, $k_{\Omega p}$ and $k_{\Omega d}$, are responsive to $f_2$, which in turn is a function of the estimated surface coefficient of adhesion, $\mu_e$. The factor $f_2$ decreases as $\mu_e$ decreases, thus $f_2$ increases the yaw rate control gains on high coefficient of adhesion surfaces (i.e., dry pavement) and decreases the yaw rate control gains on lower coefficient of adhesion surfaces (i.e., ice). Like $f_1$, then, $f_2$ operates to regulate between yaw rate control and slip angle control, increasing yaw rate control authority on high coefficient of adhesion road surfaces and decreasing yaw rate control authority on low coefficient of adhesion road surfaces.

The slip angle and yaw gains are used together with the actual and desired slip angles and actual and desired yaw rates to determine the desired corrective yaw moment, $\Delta M$, for example, according to the following equation:

$$\Delta M = k\beta p * (\beta_d - \beta_e) + k_{\beta d} * (a_y / v_x - \Omega_a) + k_{\Omega p} * (\Omega_{du} - \Omega_a) + k_{\Omega d} * (\Omega_d' - \Omega_a'),$$

where $\Omega_{du}'$ and $\Omega_a'$ are the time derivatives of $\Omega_{du}$ and $\Omega_a$, determined, for example, by passing each signal through a high pass filter. The value $(a_y / v_x - \Omega_a)$ may be passed through a high pass "wash-out" filter, for example, having a transfer function of $s/(s+1)$, in order to reduce the effects of sensor bias and banking of the road.

In the above equation for $\Delta M$, the first two terms represent the slip angle command and the third and fourth terms represent the yaw rate command. The desired corrective yaw moment command, $\Delta M$, is output from block 146 to the output command block 154.

In one example, the first term of the above equation for $\Delta M$ may be ignored. In that case the slip angle command is limited to control based on slip rate, since $\beta' \approx a_y / v_{x - \Omega a}$. This simplifies the algorithm since slip angle $\beta$ does not have to be estimated and the desired value of slip angle is not used. The control gain kod is computed as described above, i.e., it varies with vehicle speed and with the surface coefficient of adhesion but with the factor $f_1$ set equal to 1.0.

In another example, the term $(a_y / v_x - \Omega_a)$ may be replaced with a calculation of the slip angle error derivative $\Delta \beta'$ determined as follows:

$$\Delta \beta' = (\beta_e(k) - \beta_{du}(k) - (\beta_e(k-1) - \beta_{du}(k-1))) / \Delta t,$$

and then filtered through a low pass filter having a bandwidth of about 26 Hz.

In another example, the first two terms of the equation for $\Delta M$ are set to zero when a magnitude of the sum of the first two terms otherwise is not above a predetermined value, defining a dead zone below which slip angle control is not triggered. The predetermined value defining the dead zone is set as desired by the system designer.

Before the output command block 154 makes use of the corrective yaw moment command, it must first determine whether the vehicle is in an oversteer or understeer condition. An understeer condition is established if the sign of $\Delta M$ and the steer angle $\delta$ are the same. If $\delta$ and $\Delta M$ have opposite signs, i.e., the product of $\delta$ and $\Delta M$ is less than zero, or if either of the values is equal to zero, then the vehicle is designated as being in oversteer mode.

In order to avoid frequent changes in the oversteer/understeer designation due to sensor noise when either $\delta$ or $\Delta M$ are close to zero, a dead zone is introduced. That is, the vehicle is designated as being in oversteer when the product of $\delta$ and $\Delta M$ is less than or equal to zero. The vehicle is designated as being in understeer when the product of $\delta$ and $\Delta M$ is greater than THRESHD, where THRESHD is a dead zone threshold determined by the system designer. When the product of $\delta$ and $\Delta M$ is greater than zero but not greater than THRESHD, the most recent under/oversteer designation is maintained.

The corrective yaw force command, F, is determined by dividing $\Delta M$ by half of the vehicle's track width, d.

Applying the yaw force command to the actuators first involves distributing the force command to the various wheel brakes of the vehicle. As used herein, the designation of inside and outside are with respect to the direction of turn. If the vehicle is being steered right, then the right front and right rear wheels are the inside wheels and the left front and rear wheels are the outside wheels. If the vehicle is being steered left, then the left front and rear wheels are the inside wheels and the right front and rear wheels are the outside wheels. The distribution of the commanded yaw force to the wheels described below is just one specific example of distribution, other examples are described in pending U.S. patent applications, Ser. No. 08/654,982 and Ser. No. 08/732,582, both assigned to the assignee of this invention.

If there is no driver commanded braking of the vehicle, i.e., if the brake pedal of the vehicle is not depressed as sensed by the brake pedal switch, then the distribution control is as follows. In an understeer condition, braking is applied in approximately equal distribution (the exact distribution may depend on a particular vehicle) to the inside rear and inside front wheels up to the point where ABS for the front and rear wheels is activated. At that point, the braking force applied to the wheels is not increased. If the rear wheel enters ABS control before the desired braking force is developed, the portion of the brake command sent to the inside rear wheel that the inside rear wheel was not able to achieve before entering ABS control is sent to the front inside wheel. The exception to this general control is in the case when the estimated lateral force of the rear axle, $F_{yr}$, and steering angle have opposite signs. In this case, the distribution is front biased, for example, 10% of the desired force to the inside rear wheel and 90% of the desired force to the inside front wheel. In the case of a two-channel system, the entire yaw force is applied to the inside front wheel.

In oversteer when the driver is not commanding braking, the brakes are applied to the outside front wheel only and braking force may be allowed to exceed the ABS limit. That is, the ABS control is overridden and the front wheel may be allowed to rise to higher slip levels and even to achieve a lock-up condition that the ABS control would normally prevent. The ABS control is overridden when the following conditions are simultaneously met: ABS control is active; the signs of estimated lateral force of the front axle, $F_{yf}$, and steering angle are the same; the vehicle is and has been in oversteer condition for at least 0.1 seconds; and the total desired braking force of a particular wheel, $F_{xd}$, is and has been for at least 0.1 seconds at least 1.5 times larger than the estimated braking force at the ABS limit, $F_{x1lim}$. $F_{xd}$ is determined by summing, for a particular wheel, the estimated brake force requested by the vehicle driver and the brake force resulting from the yaw force command. The forces $F_{x1lim}$ for the front left and right wheels are computed as follows:

$$F_{xliml} = \begin{cases} N_{lf} * \mu_e \text{ if } |\alpha_f| \leq 0.017*(1+\mu_e) \\ \min(N_{lf}*\mu_e; N_{lf}*\mu_e^2*\lambda_{max}/|\alpha_f|) \text{ if } |\alpha_f| > 0.017*(1+\mu_e) \end{cases}$$

$$F_{xlimr} = \begin{cases} N_{rf} * \mu_e \text{ if } |\alpha_f| \leq 0.017*(1+\mu_e) \\ \min(N_{rf}*\mu_e; N_{rf}*\mu_e^2*\lambda_{max}/|\alpha_f|) \text{ if } |\alpha_r| > 0.017*(1+\mu_e) \end{cases}$$

where $\lambda_{max}$ is the maximum brake slip at the ABS limit, e.g., $\lambda_{max}=0.1$, and $N_{lf}$ and $N_{rf}$ are the estimated normal tire forces on the left and right front wheels, respectively, defined by:

$$N_{lf}=M*g*b/(2*(a+b))+K_{rllf}*M*h*a_y/trw; \text{ and}$$

$$N_{rf}=M*g*b/(2*(a+b))-K_{rllf}*M*h*a_y/trw;$$

where $K_{rllf}$ is the fraction of total roll stiffness developed by the front suspension (e.g., $K_{rllf}=0.6$), trw is the average of the front and rear track widths and h is the height of the vehicle center of gravity above the roll axis.

If there is driver commanded braking, the understeer condition is controlled as described above for the no driver-commanded braking mode, except that when both of the inside wheels (inside front wheel in a two channel system) reach an ABS limit before the total desired force is generated, then the brake command of the outside front wheel is reduced. The amount of brake command reduction to the outside front wheel is an amount necessary to transfer to the vehicle the difference between the yaw force command and the yaw force achieved by the two inside wheels before they went into ABS, except that the brake command reduction to the outside front wheel is limited so that at least a fixed percentage (e.g., 50%) of the driver commanded braking to the outside front wheel is maintained.

In the oversteer condition while there is driver commanded braking, the yaw force command is first applied to the outside front wheel brake, increasing brake force, possibly including to a point allowing the wheel to override the ABS limit. If the force achieved by the outside front wheel is not sufficient to produce the desired corrective yaw moment on the vehicle, braking of the inside rear wheel may be reduced by up to 50% of the driver commanded braking force for that wheel and if the force achieved by the outside front wheel and inside rear wheel (outside front only for a two channel system) is still not sufficient, then braking of the inside front wheel may be reduced by up to 50% of the driver commanded braking force for that wheel. When the ABS is overridden, the locking of the outside front wheel reduces the lateral force of the front wheel, which reduction of lateral force may be taken into account when calculating the corrective yaw moment.

Once the force commands are determined, they may be applied to the actuators as represented by line 158 and block 132. In this control, it is necessary to reasonably estimate the amount of brake force applied at each particular wheel to determine the portion of the corrective yaw moment achieved by that wheel. There are many known ways of determining brake force in an individual wheel. In one example, hydraulic fluid pressure sensors in the individual wheel brake lines sense the amount of hydraulic pressure in the individual wheel brakes, and that sensed hydraulic pressure corresponds to a brake force measurement. In vehicles where the brake actuators are motor driven reciprocating piston devices, the brake force may be determined by either position control or motor current feedback of the actuators, which position and/or motor current signals are taken as measurements of brake force at the individual wheels. Any other known method for measuring brake force at the individual wheels may be used and provided as feedback as represented by line 152 to the output command block 154, for example to implement closed loop proportional derivative control of the actuators represented by block 132.

Figure 10:
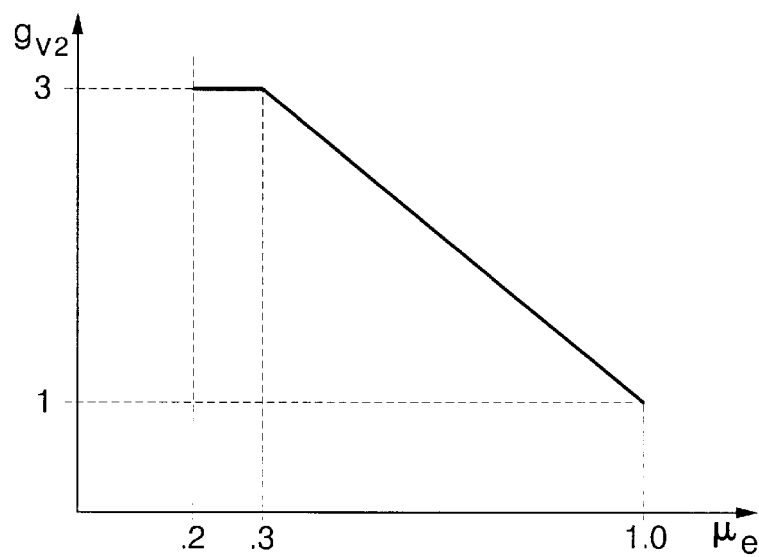

In vehicles where there is no means to provide a feedback of actual brake force through a brake actuator or pressure transducer, individual wheel speed control may be used to implement the brake force command in the vehicle wheel brakes. In one example, the desired yaw force, F, may be converted into a wheel speed difference command (commanding a speed difference between left and right wheels) as follows:

$$\Delta v_{x0}=F*g_{v1}*g_{v2},$$

where $g_{v1}$ is a first gain value that varies linearly with vehicle speed and $g_{v2}$ is a second gain value that varies non-linearly with the estimated surface coefficient of adhesion. An example graph of $g_2$ is shown in FIG. 10.

Figure 11:
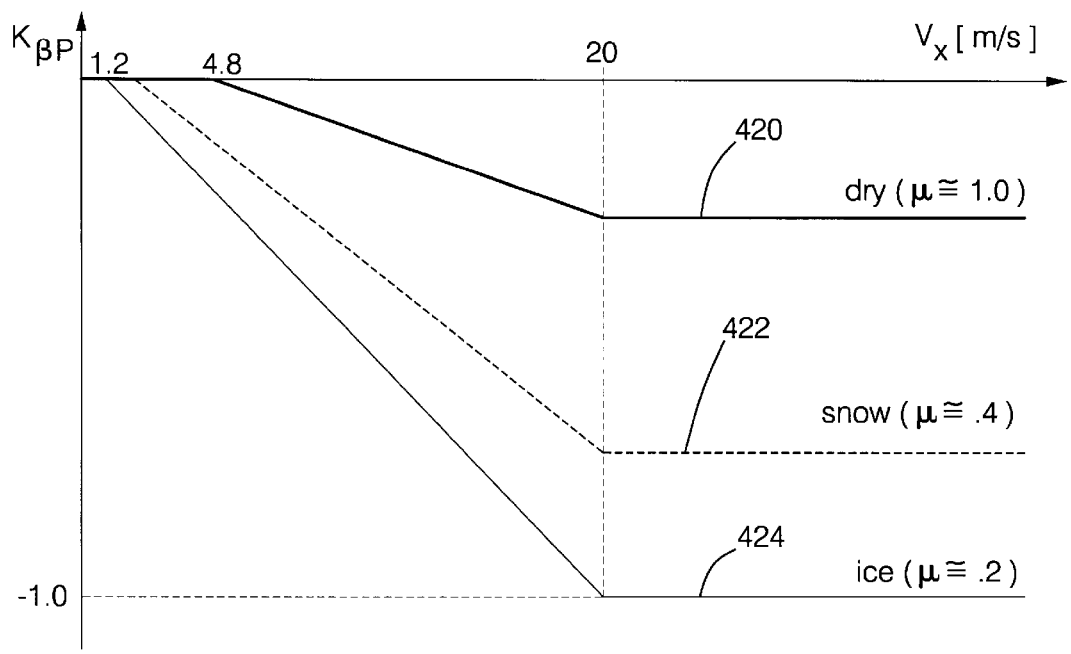

In another example, the desired wheel speed difference, $\Delta v_{x0}$, is related directly to the slip angle errors and yaw rate errors without the intermediate step of calculating the desired yaw force. In that case:

$$\Delta v_{x0}=[k_{\beta p}*(\beta_d-\beta_e)+k_{\beta d}*(a_y/v_x-\Omega_a)+k_{\Omega p}*(\Omega_d-\Omega_a)+k_{\Omega d}*(\Omega_{du}'-\Omega_a')]*v_x,$$

where the control gains $k_{\beta p}$, $k_{\beta d}$, $k_{\Omega p}$ and $k_{\Omega d}$ are determined in the same manner as described above in connection with $\Delta M$, except that $k'_{\beta p}$ and $k'_{\Omega p}$ are determined as follows. The preliminary proportional gain $k'_{\Omega p}$ is constant or speed dependent. The preliminary slip angle gain $k'_{\beta p}$ is determined (e.g., by using look-up tables) as a function of the estimated surface coefficient of adhesion, $\mu_e$, and vehicle speed, $v_x$. An example of relationships between $k'_{\beta p}$ and vehicle speed on three different road surfaces are shown in FIG. 11. Reference 420 illustrates the relationship for a dry road surface having $\mu=1.0$. Reference 422 illustrates the relationship for a snowy road surface having $\mu=0.4$ and reference 424 illustrates the relationship for an icy road surface having $\mu=0.2$. For intermediate coefficients of adhesion, linear interpolation may be used.

The wheel speed difference actually applied to the wheels, $\Delta v_x$, is determined by $\Delta v_{x0}$, and the kinematics of the turn, i.e., $$\Delta v_x = \Delta v_{x0}+\Omega_a*trw;$$

where trw is the track width (for the axle to which $\Delta v_x$ is applied).

The wheel speed difference command, $\Delta v_x$, is distributed to the vehicle wheels as the yaw force command is distributed above. For example, in the understeer condition when no driver braking is applied, half of $\Delta v_x$ is applied to the inside rear wheel and half $\Delta v_x$ is applied to the inside front wheel to reduce the inside rear wheel speed by $0.5*\Delta v_x$ less than its original speed prior to activation of the yaw control and to reduce the inside front wheel speed by $0.5*\Delta v_x$ less than its original speed prior to activation of the yaw control. If the rear wheel enters ABS then the front wheel is slowed by an amount $\Delta v_{xf}$ equal to $\Delta v_x$ minus $\Delta v_{xr}$, where $\Delta v_{xr}$ is the amount of inside rear wheel speed reduction achieved prior to the inside rear wheel entering ABS.

The wheel speed control is similarly applied for the other braking distributions described above. Thus closed loop wheel speed control may be used to transfer the desired corrective yaw force, F, capable of achieving the desired corrective yaw moment, $\Delta M$, to the vehicle body.

The commands determined at block 154 are only applied to the vehicle wheel brakes if the entry conditions for the active brake control are established and then are only applied until the exit conditions for active brake control are established. First the estimated vehicle speed must be above a certain speed of entry, $v_{min}$, which is typically low, for example 5 miles per hour. If this condition is satisfied, then the system becomes active when either yaw rate error exceeds a yaw rate error threshold or when the corrective yaw moment, $\Delta M$, exceeds a corrective yaw moment threshold (or when wheel speed difference, $\Delta v_x$, exceeds a threshold). The yaw rate error test may be implemented by:

$$|\Omega_d - \Omega + k_e*(\Omega_{du}' - \Omega_a')| > \Omega_{thresh},$$

where $\Omega_{du}'$ and $\Omega_a'$ may be determined by passing $\Omega_{du}$ and $\Omega_a$ through high pass filters to time differentiate them, $k_e$ is a fixed constant and $\Omega_{thresh}$ is determined in response to vehicle speed and steering wheel angle. In one example, $\Omega_{thresh}$ is determined as follows:

$$\Omega_{thresh} = (9 - 0.036*v_x + 1.3*(v_x*\delta)/((a+b) + K_u*v_x^2))/57.3,$$

if the vehicle is in understeer mode, and as:

$$\Omega_{thresh} = (7 + 1.3*(v_x*\delta)/((a+b) + K_u*v_x^2))/57.3,$$

if the vehicle is in oversteer mode. In the above equations, $\Omega_{thresh}$ is expressed in (rad/s), $v_x$ is expressed in (m/s), $\delta$ is expressed in (rad), a and b are expressed in (m) and $K_u$ is the vehicle understeer coefficient.

An exit condition is established if the total corrective yaw moment drops below a predetermined threshold value and remains below that value for a predetermined period of time or if the yaw rate error is below a predetermined yaw rate error threshold for a predetermined period of time. If either of these conditions exists, the output command block 154 is disabled and prevented from providing output commands to actuators 132 to establish corrective yaw moments on the vehicle. An exit condition is also established regardless of the above conditions if the vehicle speed drops below the speed of exit.

Referring now to FIG. 4, an example main flow control routine illustrating example steps performed by a controller for achieving the desired yaw rate and slip angle control herein is illustrated. At block 250 the system receives the inputs from the various system sensors and then at block 252 the vehicle determines the desired vehicle states as described above with reference to block 102 in FIG. 3. Block 254 estimates the lateral coefficient of adhesion between the vehicle tires and the road surface as described above with reference to block 120 in FIG. 3. At block 256, the routine estimates the actual vehicle slip angle as described above with reference to block 122 in FIG. 3. Block 258 then determines the control gains for the slip and yaw rate commands as described above with reference to blocks 138 and 142 in FIG. 3. Block 260 then determines the corrective yaw moment command, $\Delta M$, (or the desired wheel speed difference, $\Delta v_x$)as described above with reference to block 154 in FIG. 3 and block 262 performs the enter/exit control determination. If the enter/exit control block 262 enables actuator control, then the actuator commands are determined at block 264 and output at block 266 to the various vehicle wheel brake actuators to achieve the desired corrective yaw moment on the vehicle body to minimize yaw rate error and vehicle slip angle error.

Figure 5:
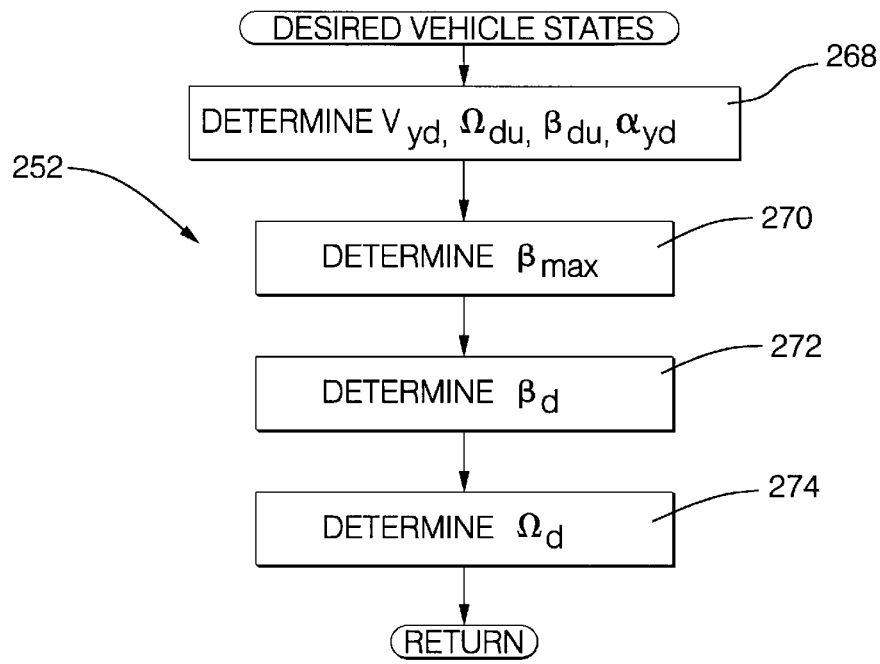

Referring now to FIG. 5, the steps for determining the desired vehicle states at block 252 (FIG. 4) are shown. At block 268, the vehicle model described above with reference to block 102 in FIG. 3 is used to determine $v_{yd}$, $\Omega_{du}$, $a_{yd}$, and $\beta_{du}$. Next, block 270 uses the estimated surface coefficient of adhesion and the steering wheel angle to determine $\beta_{max}$, which is used with $\beta_{du}$ to determine $\beta_d$ at block 272. Block 274 determines $\Omega_d$. of the steps, 268, 270, 272 and 274 may be implemented as described above with reference to FIG. 3, block 102.

Figure 6:
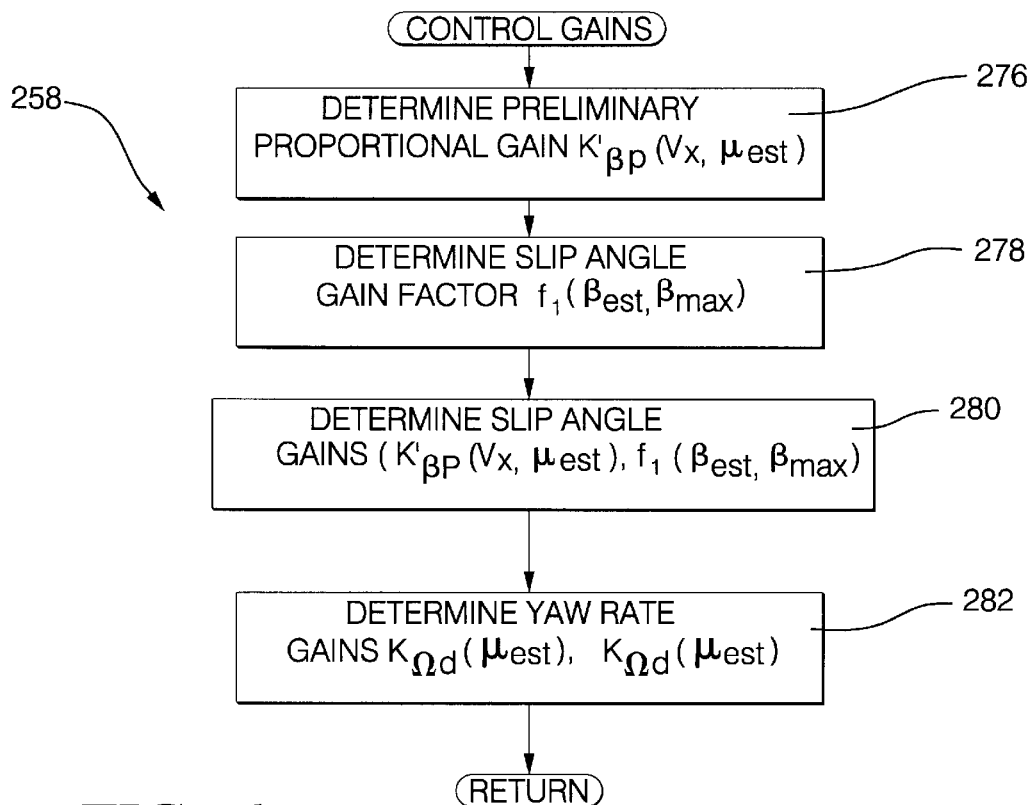

FIG. 6 illustrates the steps performed by block 258 in FIG. 4 for determining the control gains for the yaw rate command and slip angle command. More particularly, block 276 determines the preliminary proportional gain, $k'_{\beta p}$, as a function of $v_x$ and $\mu_e$ and block 278 determines the slip angle gain factor, $f_1$, as a function of $\beta_e$ and $\beta_{max}$. Then block 280 determines the slip angle gains as a function of $k'_{\beta p}$ and $f_1$. Block 282 determines the yaw rate proportional and derivative gains as a function of $\mu_e$. The steps at blocks 276, 278, 280 and 282 may be implemented as described above with reference to blocks 138 and 142 in FIG. 3.

Figure 7:
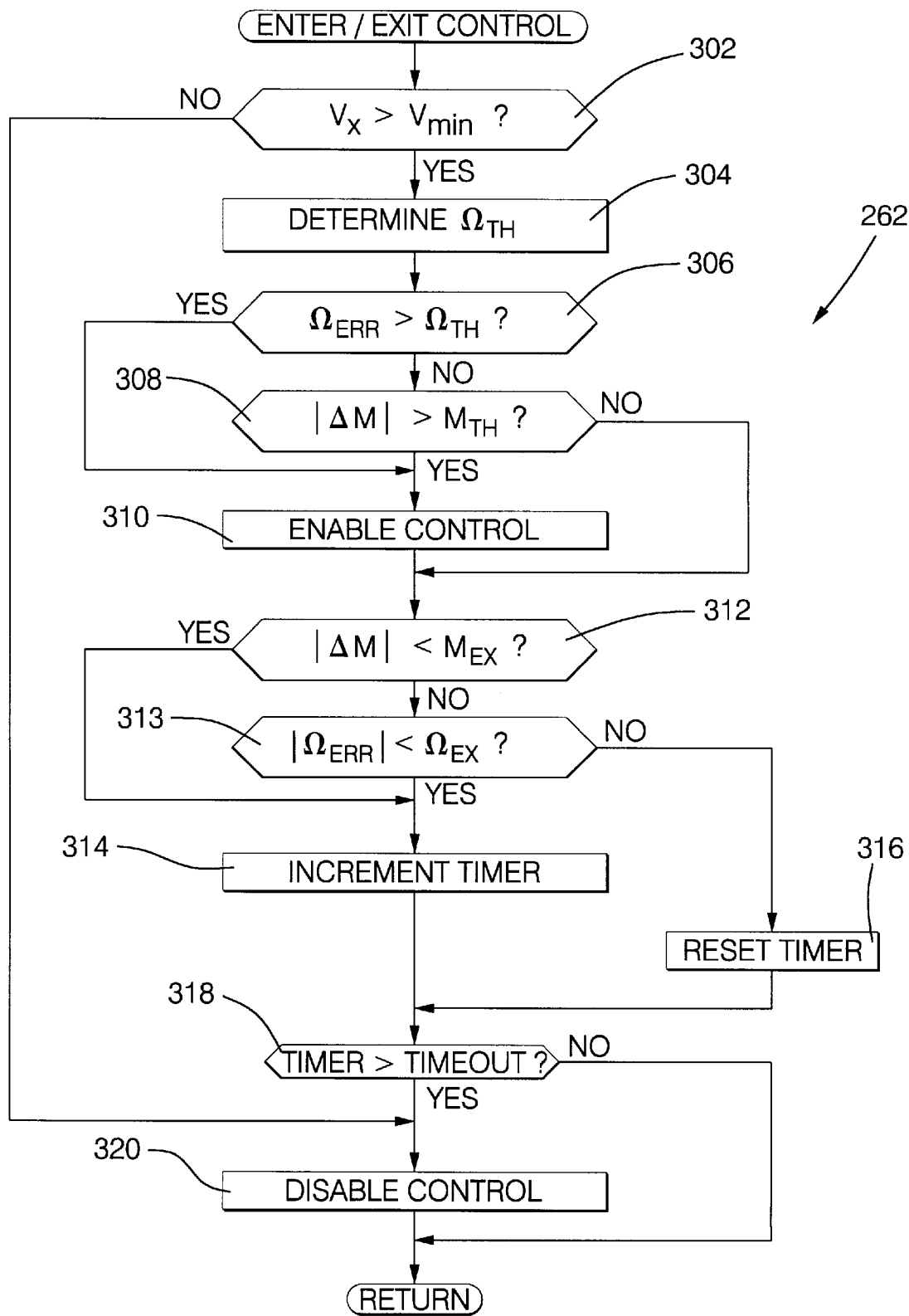

Referring now to FIG. 7, the steps performed by the enter/exit control block 262 in FIG. 4 are shown. First at block 302, the forward vehicle velocity, $v_x$, is compared to a minimum velocity. If $v_x$ is not greater than the minimum vehicle velocity, the routine continues to block 320 where a flag is set, disabling the active brake control. If $v_x$ is greater than the minimum vehicle velocity, the routine continues to block 304 where it determines $\Omega_{thresh}$, as described above with reference to block 154 in FIG. 3. If $\Omega_{err}$ is greater than $\Omega_{thresh}$ at block 306, then the routine continues to block 310. Otherwise, the routine continues to block 308 where it compares the magnitude of the command $\Delta M$ to a threshold moment value. If $\Delta M$ does not have a magnitude greater than the threshold moment value, then the routine continues to block 312. Otherwise, the routine continues to block 310, where a flag is set enabling control of the brake system through the active brake control.

At blocks 312 and 313, the absolute values of $\Delta M(\Delta v_x)$ and $\Omega_{err}$ are compared to the exit threshold values. If either $\Delta M(\Delta v_x)$ or $\Omega_{err}$ is less than the exit threshold values, the routine continues to block 314 where a timer is incremented. Otherwise, at block 316, the timer is reset. Block 318 compares the timer to a time out value. If the timer is greater than the time out value, the routine continues to block 320 where the flag is set disabling active brake control. Otherwise, the enter/exit control 262 is exited.

Another example of entry/exit conditions is set forth in pending U.S. patent application, Ser. No. 08/732,582.

Figure 8:
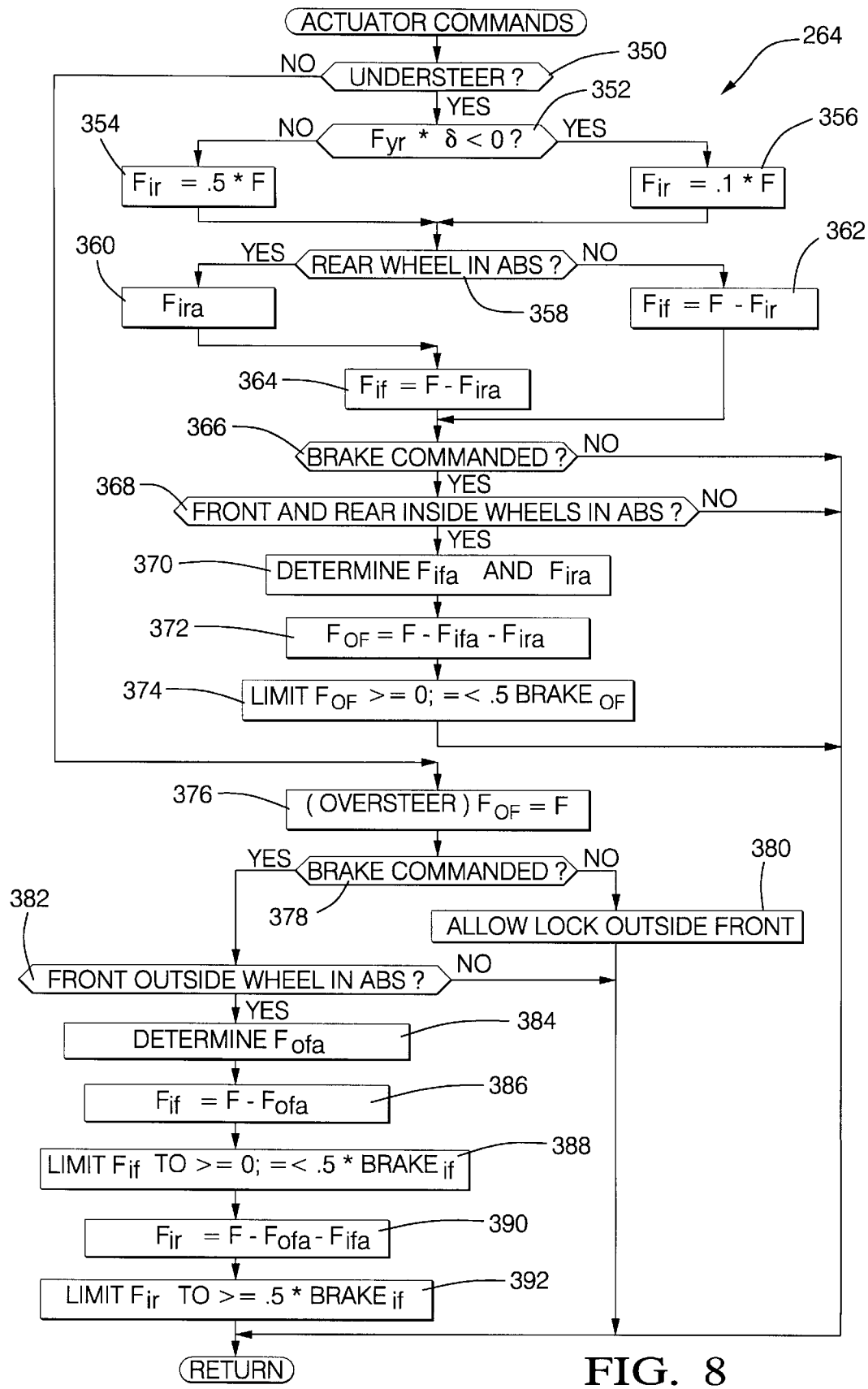

Referring now to FIG. 8, example steps performed by the actuator command block 264 in FIG. 4 are shown. First block 350 checks the understeer flag that, as described above with reference to block 154 in FIG. 3, indicates whether or not the vehicle is experiencing understeer or oversteer. If the understeer flag is set, the routine continues to block 352 where it compares the signs of the estimated lateral force at the rear axle, $F_{yr}$, and the vehicle steering wheel angle. If they are different, for example, when the product $F_{yr}*\delta$ is less than zero, then the routine continues to block 356 where it sets the rear inside wheel force command $F_{ir}$ equal to 0.1*F. If at block 352, $F_{yr}*\delta$ is not less than zero, then block 354 sets $F_{ir}$ equal to 0.5*F. This portion of the algorithm is used only for a four channel system.

From blocks 354 or 356, the routine continues to block 358 where it checks whether or not the inside rear wheel is in ABS mode. If so, block 360 determines the actual force applied by the inside rear wheel when it entered ABS, $F_{ira}$, and block 364 determines inside the front wheel force command, $F_{if}$, equal to F minus $F_{ir}$. If, at block 358, the rear wheel is not in ABS, then block 362 sets the inside front wheel command equal to $F-F_{ir}$. Then at block 366, the routine checks whether or not braking is commanded by the vehicle driver, for example, by determining whether or not there is an output signal from the brake pedal switch or from the master cylinder pressure transducer. If not, the subroutine 264 exits. Otherwise, the routine continues to block 368 where it checks whether or not the inside front and rear wheels are in ABS. If so, block 370 determines the actual force achieved by the inside front and rear wheels, $F_{ifa}$ and $F_{ira}$, and then block 372 determines an outside front wheel brake force command, $F_{of}$, equal to $F-F_{ifa}-F_{ira}$. Block 374 limits the command $F_{of}$ to a value between zero and half of the driver commanded brake force of the outside front wheel. From block 374 the routine is exited.

If at block 350 the routine is not in understeer mode, then it proceeds to the oversteer steps at block 376 where the outside front wheel force command, $F_{of}$, is set equal to F. Then block 378 checks whether or not braking is commanded. If not, block 380 sets a flag inhibiting activation of ABS control of the outside front wheel so that the outside front wheel is allowed to lock if the command, $F_{of}$, so commands (the conditions under which the wheel is allowed to lock were specified above). From block 380, the subroutine 264 is exited.

If at block 378 there is driver commanded braking, the routine continues to block 382 where it checks whether the outside front wheel is in ABS. If not, the subroutine 264 is exited. If so, the subroutine continues to block 384 where it determines the actual braking force achieved by the outside front wheel, $F_{ofa}$. The routine then moves to block 386 where an inside front wheel brake force command, $F_{if}$, is determined equal to $F-F_{ofa}$. If the outside front wheel is allowed to lock, then the effect of reduction in lateral force on the vehicle yaw moment is included in the above calculation; this yields:

$$F_{if}=F-F_{ofa}-\mu_e*N_{of}*a*2/trw;$$

where $N_{of}$ is the normal force on the outside front wheel determined as described above with reference to the lock-up conditions. The inside front wheel brake force command is then limited to half the driver-commanded braking to that wheel, as determined by the driver's brake request at block 378. Block 390 then determines the inside rear wheel brake force command as the difference between the commanded yaw force, F, and the yaw forces achieved by the outside and inside front wheels. At block 392, the inside rear wheel brake force is limited to no greater than one half the driver commanded braking to the inside rear wheel.

It is noted that in the oversteer mode when there is driver braking, the front and rear inside wheel brake force commands, $F_{if}$ and $F_{op}$, command reduction in the braking force at the front and rear inside wheels. Similarly, in the understeer mode when there is driver braking, the outside front wheel brake command, Fof, commands a reduction in the braking force applied to the outside front wheel.

For vehicles with no means to provide feedback of actual brake force through a brake actuator or pressure transducer, the same logic for distributing the command signal among the wheels applies with the brake forces replaced by the corresponding changes in wheel velocities.

Figure 12:
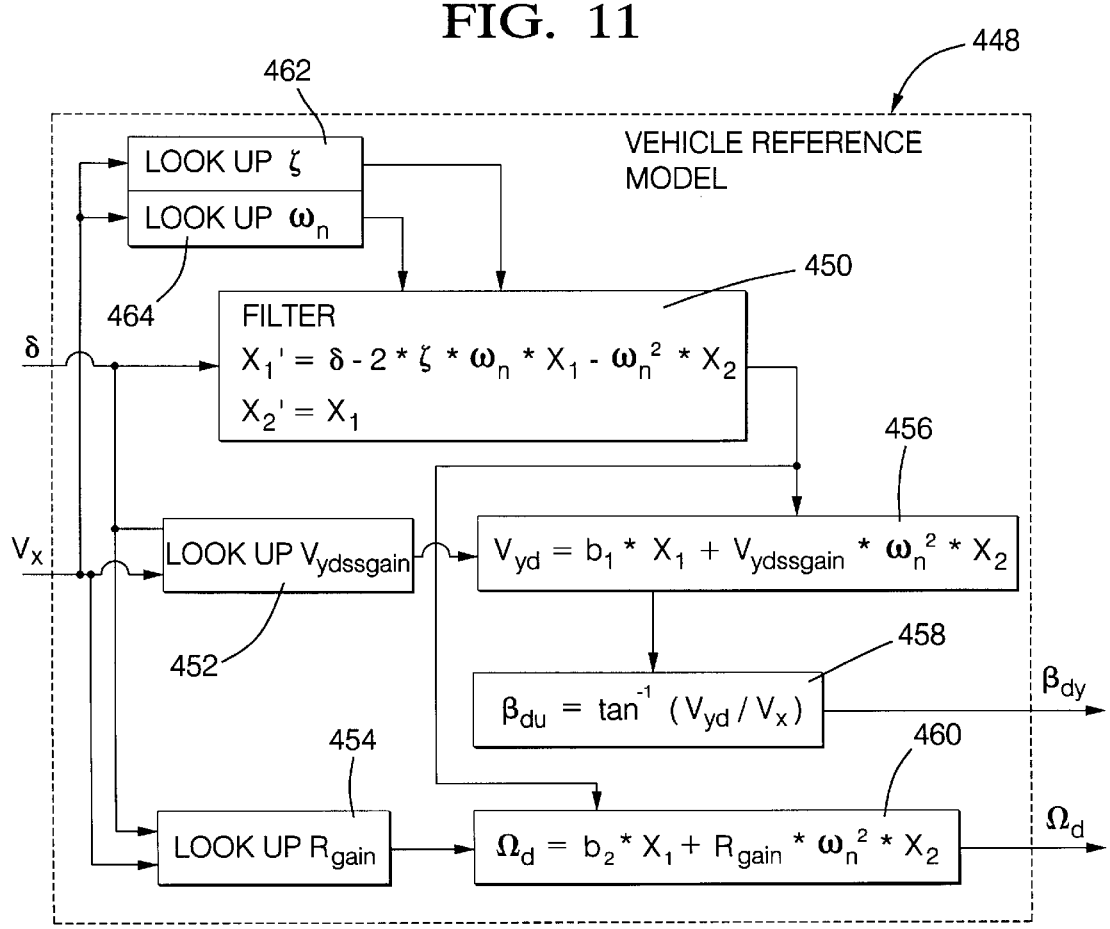
FIG. 12 illustrates an example vehicle reference model.

FIG. 12 illustrates another example vehicle reference model for determining desired yaw rate, $\Omega_d$, and desired slip angle, $\beta_d$. The vehicle reference model 458 shown includes a single filter 450, four look up tables (or equations) 452, 454, 462 and 464 and three simple equation functions 456, 458 and 460. The filter 450 implements the desired vehicle dynamics as represented by the damping ratio and natural frequency in a single filter whose output is used by the relatively simple calculations in blocks 456, 458 and 460 to calculate both the desired slip angle and desired yaw rate.

More particularly, the damping ratio and natural frequency may be expressed according to the system parameters as follows:

$$\omega_n=(a_{11}*a_{22}-a_{12}*a_{21})^{1/2} \text{ and}$$

$$\zeta=-(a_{11}+a_{22})/(2*(a_{11}*a_{22}-a_{12}*a_{21})^{1/2}),$$

or in any reasonably desired values which vary with speed and which can be programmed into controller memory as look-up tables 462 and 464 responsive to the vehicle speed input $v_x$ or implemented as calculations.

Using $\omega_n$ and $\zeta$ and the steering wheel angle input $\delta$, the filter 450 performs a filter function as follows:

$$x_1'=\delta-2*\zeta*\omega_n*x_1-\omega_n^2*x_2$$

$$x_2'=x_1$$

with the filter result provided to blocks 456 and 460. Block 456 also receives the slip angle gain output of block 452, which is a three dimensional look up table implementing the following function:

$$V_{ydssgain}=(\delta*v_x/((a+b)+K_u*v_x^2))*(b-(a*M*v_x^2)/((a+b)*c_r)).$$

Using $V_{ydssgain}$, $\omega_n$ and the output of filter 450, block 456 determines the desired lateral velocity $v_{yd}$, according to:

$$v_{yd}=b_1*x_1+V_{ydssgain}*\omega_n^2*x_2.$$

Block 458 then determines $\beta_{du}$ according to:

$$\beta_{du}=\tan^{-1}(v_{yd}/v_x).$$

Block 454 is a look up table determining the yaw rate gain according to the function:

$$R_{gain}=(\delta*v_x/((a+b)+K_u*v_x^2))$$

Using $R_{gain}$, $\omega_n$ and the output of filter 450, block 460 determines the desired yaw rate $\Omega_d$, according to:

$$\Omega_d=b_2*x_1+R_{gain}*\omega_n^2*x_2.$$

Using the above approach allows the system designer to (a) select the damping ratio and natural frequency desired of the vehicle reference model, (b) define a single filter representing the selected damping ratio and natural frequency, (c) apply steering angle to the filter, (d) use the filter output with a predetermined slip angle gain function to determine desired vehicle slip angle and (e) use the filter output with a predetermined yaw gain function to determine the desired vehicle yaw rate.

Figure 13:
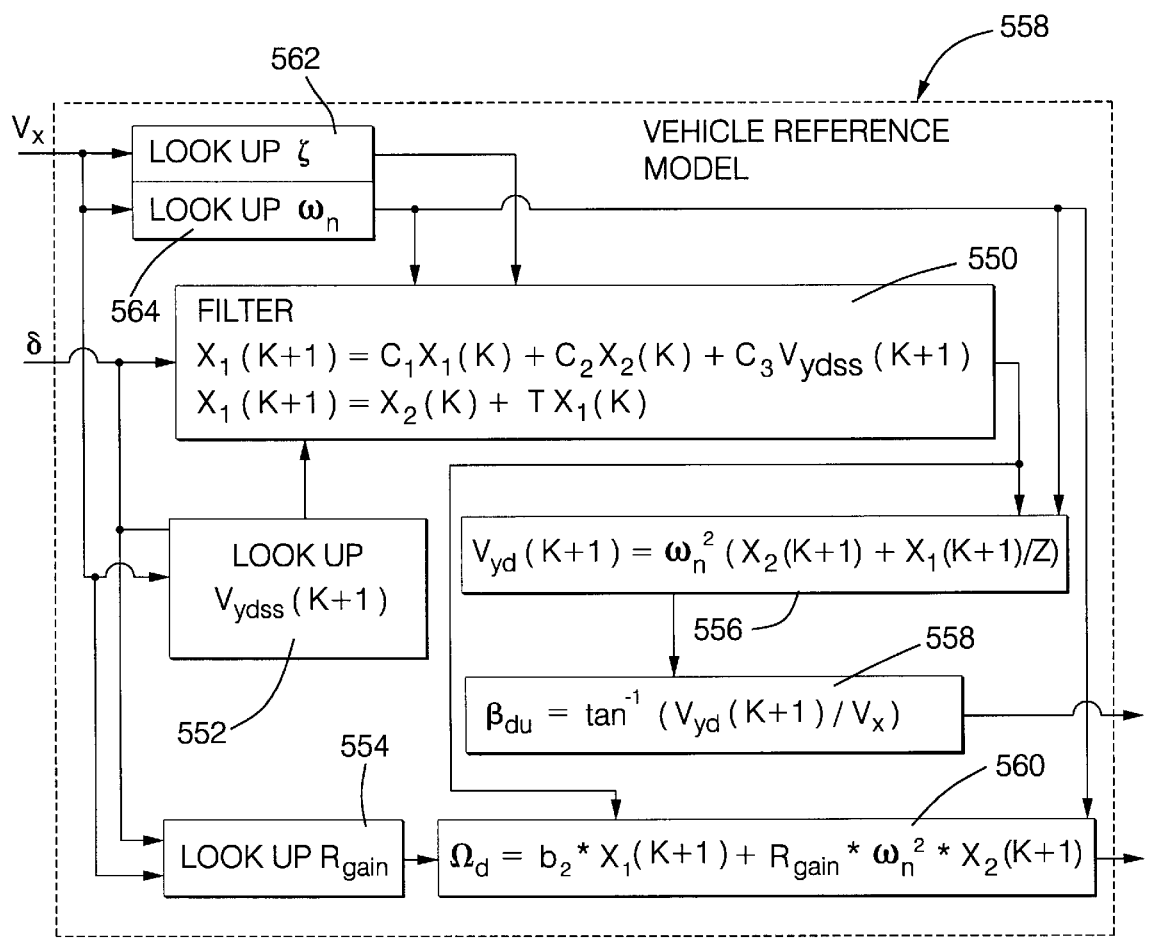
FIG. 13 illustrates another example vehicle reference model.

FIG. 13 illustrates another example vehicle reference model using a single filter. The vehicle reference model 558 includes the single filter 550, look up tables 552, 554, 562 and 564 and functions 556, 558 and 560. The look up tables 562, 564 and 554 are the same as look up tables 462, 464 and 454 shown in FIG. 12. Similarly, the function blocks 558 and 560 are the same as function blocks 458 and 460 in FIG. 12.

Filter 550 is implemented in discrete form according to:

$$x_1(k+1) = c_1 * x_1(k) + c_2 * x_2(k) + c_3 * V_{ydss}(k+1), \text{ and}$$

$$x_2(k+1) = x_2(k) + T * x_1(k),$$

where $$c_1 = 1/(1 + 2*\zeta*\omega_n*T),$$

$$c_2 = -*c\omega_n^2 c_3, \text{ and}$$

$$c_3 = T*c_1,$$

where T is the sampling period, and where $$V_{ydss}(k+1) = (\delta * v_x(k)/((a+b) + K_u * v_x(k)^2)) * (b - (a*M*v_x(k)^2)/((a+b)*c_r)).$$

The output of filter 550 is used by block 556 to compute the desired lateral velocity, $v_{yd}(k+1)$, according to:

$$V_{yd}(k+1) = \omega_n^2 * (x_2(k+1) + x_1(k+1)/z),$$

where $z = a_{12} * b_2 / b_1 - a_{22}$. The computation at block 556 is performed in a two-step process. First the value of z is computed and, if z equals zero, then z is limited to a predetermined minimum magnitude.

We claim:

1. A brake system control for use in a vehicle with a body, comprising the steps of:
    determining a first error between an actual yaw rate of the vehicle and a desired yaw rate of the vehicle;
    determining a second error between an estimated slip angle of the vehicle and a desired slip angle of the vehicle;
    determining a yaw rate command responsive to the first error;
    determining a slip angle command responsive to the second error;
    summing the yaw rate command and the slip angle command to determine a summed command including the yaw rate and slip angle commands; and
    applying the summed command to at least one vehicle brake actuator to impart a yaw moment on the vehicle body, wherein the yaw rate command reduces the first error and the slip angle command reduces the second error.

2. A brake system control according to claim 1, also comprising the step of:
    limiting the desired slip angle to a maximum value, wherein the maximum value varies responsive to an estimated surface coefficient of adhesion between vehicle wheels and a road surface.

3. A brake system control according to claim 2, wherein the maximum value varies also responsive to the desired slip angle.

4. A brake system control according to claim 1, wherein the slip angle command is also responsive to a gain set.

5. A brake system control according to claim 4, wherein the gain set varies responsive to a measured vehicle speed.

6. A brake system control according to claim 4, wherein the gain set varies as responsive to an estimated surface coefficient of adhesion between vehicle wheels and a road surface.

7. A brake system control according to claim 4, wherein the gain set varies responsive to the estimation of slip angle of the vehicle, wherein a control authority of the slip angle control increases as the vehicle slip angle increases.

8. A brake system control according to claim 1, wherein the yaw rate command is also determined responsive to a gain set.

9. A brake system control according to claim 8, wherein the gain set varies responsive to a measured vehicle speed.

10. A brake system control according to claim 8, wherein the gain set varies responsive to an estimated coefficient of adhesion between vehicle wheels and a road surface, wherein a control authority of the yaw rate control increases as the estimated coefficient of adhesion increases.

11. A brake system control for use in a vehicle with wheels, wheel brakes and a body, comprising the steps of:
    measuring a plurality of vehicle parameters;
    responsive to the measured parameters, determining at least a vehicle yaw rate, a vehicle slip angle, a desired yaw rate and a desired slip angle;
    responsive to the measured parameters, estimating a coefficient of adhesion between the vehicle wheels and a road surface;
    implementing a control responsive to the vehicle yaw rate and the desired yaw rate with a first authority and responsive to the vehicle slip angle and the desired slip angle with a second authority, wherein the first authority increases as the estimated coefficient of adhesion increases and decreases as the estimated coefficient of adhesion decreases; and
    controlling the wheel brakes responsive to the control to minimize a first difference between the vehicle yaw rate and the desired yaw rate and to minimize a second difference between the vehicle slip angle and the desired slip angle.

12. A brake system control according to claim 11, wherein the control of the wheel brakes operates in a first mode when an oversteer condition is detected and in a second mode when an understeer condition is detected, wherein detection of whether the oversteer condition exists and whether the understeer conditions exists is responsive to a steering angle, a difference between the vehicle yaw rate and the desired yaw rate, a difference between the vehicle slip angle and the desired slip angle and the estimated coefficient of adhesion.

13. A brake system control according to claim 11, wherein the control of the wheel brakes distributes force to individual wheel brakes responsive to the control, whether a vehicle driver is braking the vehicle, a direction of a steering angle, whether an oversteer condition exists and estimates of lateral tire forces of the wheels.

14. A brake system control apparatus for use in a vehicle with wheels, wheel brakes and a body, comprising:
    a plurality of sensors for measuring a plurality of vehicle parameters;
    a microprocessor controller comprising:
        a surface coefficient of adhesion estimator, responsive to the measured parameters, providing estimated coefficient of adhesion between the vehicle wheels and a road surface;

a vehicle reference model, responsive to measured steering angle and speed for providing signals indicative of desired yaw rate and desired slip angle;

an observer, responsive to the measured parameters, for providing estimates of vehicle lateral velocity and vehicle slip angle;

a gain generator for generating first and second gain sets, wherein the first gain set is responsive to the estimated surface coefficient of adhesion;

a control command generator responsive to the observer, the vehicle reference model, the measured parameters and the first and second gain sets providing a control output having a first function responsive to the first gain set, the vehicle yaw rate and the desired yaw rate and a second function responsive to the second gain set, the vehicle slip angle and the desired slip angle; and controlling the wheel brakes responsive to the control to minimize a first difference between the vehicle yaw rate and the desired yaw rate and to minimize a second difference between the vehicle slip angle and the desired slip angle.

15. A brake system control apparatus according to claim 14, wherein gain values of the first gain set increase as the estimated coefficient of adhesion increases and decrease as the estimated coefficient of adhesion decreases, wherein control of yaw rate of the vehicle body has more authority on high coefficient of adhesion road surfaces and less authority on low coefficient of adhesion road surfaces.

16. A brake system control apparatus according to claim 14, wherein the second gain set is responsive to the estimation of vehicle slip angle and gain values of the second gain set increase as the vehicle slip angle increases, wherein control of slip angle of the vehicle body has more authority when the vehicle body has a large slip angle and less authority when the vehicle body has a small slip angle.

* * * * *